US012771575B2

(12) United States Patent
Martinez

(10) Patent No.: US 12,771,575 B2
(45) Date of Patent: Oct. 20, 2026

(54) VEHICULAR COMMUNICATION PROTOCOLS WITH CO-CHANNEL COEXISTENCE AND INTER-SYMBOL INTERFERENCE CALCULATION

(71) Applicant: NXP B.V., Eindhoven (NL)

(72) Inventor: Vincent Pierre Martinez, Venerque (FR)

(73) Assignee: NXP B.V., Eindhoven (NL)

( * ) Notice: Subject to any disclaimer, the term of this patent is extended or adjusted under 35 U.S.C. 154(b) by 354 days.

(21) Appl. No.: 18/338,754

(22) Filed: Jun. 21, 2023

(65) Prior Publication Data

US 2023/0421413 A1 Dec. 28, 2023

(30) Foreign Application Priority Data

Jun. 24, 2022 (EP) .................................... 22305918

(51) Int. Cl.
*H04L 27/02* (2006.01)
*H04L 25/02* (2006.01)
*H04L 25/03* (2006.01)
*H04L 27/26* (2006.01)

(52) U.S. Cl.
CPC ...... *H04L 25/0204* (2013.01); *H04L 25/0212* (2013.01); *H04L 25/03019* (2013.01); *H04L 27/2613* (2013.01); *H04L 27/2647* (2013.01)

(58) Field of Classification Search
CPC ............. H04L 25/0204; H04L 25/0212; H04L 25/03019; H04L 27/2613; H04L 27/2647
USPC .......................................................... 375/347
See application file for complete search history.

(56) References Cited

U.S. PATENT DOCUMENTS

| | | | | |
|---|---|---|---|---|
| 7,724,847 | B2 | 5/2010 | Bublil et al. | |
| 10,404,517 | B1 | 9/2019 | Sun et al. | |
| 2005/0147025 | A1 * | 7/2005 | Auer | H04B 7/0684 375/267 |
| 2010/0220826 | A1 | 9/2010 | McCloud et al. | |
| 2010/0284445 | A1 | 11/2010 | Barriac et al. | |

(Continued)

FOREIGN PATENT DOCUMENTS

| | | | | |
|---|---|---|---|---|
| EP | 1523143 | A1 * | 4/2005 | H04L 27/2613 |
| KR | 20160069466 | A | 6/2016 | |

OTHER PUBLICATIONS

Fischer, M., "Interoperable Approach for NGV New Modulations", Doc. IEEE 802.11-19/0082r3, May 2019.

(Continued)

*Primary Examiner* — Kevin M Burd

(57) ABSTRACT

RF signal is received (1006). The received RF signal includes a first RF signal encoding a first orthogonal frequency-division multiplexing (OFDM) symbol of a first long-term evolution (LTE) V2X data packet. A channel estimation in the time domain is determined (1012) using the received signal and an as-transmitted time domain version of an L-LTF symbol is determined (1014). The channel estimation in the time domain is applied to the as-transmitted time domain version of the L-LTF symbol to determine an as-transmitted version of the L-LTF symbol that exhibits channel fading (1018). A first portion of the as-transmitted version of the L-LTF symbol that exhibits channel fading is subtracted from a second portion of the received RF signal (1022) to remove inter-symbol interference from the received signal to generate a second received RF signal.

17 Claims, 12 Drawing Sheets

(56) References Cited

U.S. PATENT DOCUMENTS

| | | | | |
|---|---|---|---|---|
| 2010/0285738 | A1 | 11/2010 | Howard et al. | |
| 2010/0285769 | A1 | 11/2010 | Conroy et al. | |
| 2016/0352539 | A1* | 12/2016 | Dhakal | H04L 25/0256 |
| 2020/0008026 | A1* | 1/2020 | Martinez | H04W 4/40 |
| 2020/0015111 | A1* | 1/2020 | Martinez | H04L 1/0054 |
| 2021/0229952 | A1* | 7/2021 | Manica | B66B 1/2458 |
| 2022/0385522 | A1 | 12/2022 | Newman et al. | |

OTHER PUBLICATIONS

Ji, Y., "An Inter Symbol Interference Estimation and Cancellation Scheme for Asynchronous Distributed Differential Space-Time Code", IEEE Communications Letters, vol. 17, Issue 10, Oct. 2013.

Lin, X., "Performance Analysis of Asynchronous Multicarrier Wireless Networks", IEEE Transactions on Communications, vol. 63, Issue 9, Sep. 2015.

U.S. Appl. No. 18/338,795, filed Jun. 21, 2023, entitled "Vehicular Communication Protocols With Co-Channel Coexistence".

ETSI ERMTG37(21)000096: "TR103766: PHY simulation results for multiple ITS-G5 headers sent in the same LTE-V2X subframe"; (Mar. 2021); relevant section: "6 Fading channels at the ITS-G5 receiver"; 4 pages.

ETSI TR 103 766 V1.1.1 "Intelligent Transport Systems (ITS); Pre-standardization study on co-channel co-existence between IEEE- and 3GPP-based ITS technologies in the 5 855 MHz-5 925 MHz frequency band" (Sep. 2021), relevant section 6,3,3 and Annex A; 9 pages.

ETSI TS 103 613 V1.1.1 "Intelligent Transport Systems (ITS);Access layer specification for Intelligent Transport Systems using LTE Vehicle to everything communication in the 5.9 GHz frequency band (Nov. 2018), relevant section: Annex B (normative): LTE-V2X information elements"; 4 pages.

ETSI TS 136 211 (V14.7.0): "LTE; Evolved Universal Terrestrial Radio Access (E-UTRA); Physical channels and modulation (3GPP TS 36.211 version 14.7.0 Release 14)"; (Oct. 2018) ; Relevant sections: "9.3 Physical Sidelink Shared Channel"; 3 pages.

ETSI TS 136 212 (V14.6.0): "LTE; Evolved Universal Terrestrial Radio Access (E-UTRA); Multiplexing and channel coding (3GPP TS 36.212 version 14.6.0 Release 14)" (Jul. 2018); relevant sections "4.3 Sidelink", "5.4.2 Sidelink shared channel", "5.4.3 Sidelink control information"; 4 pages.

ETSI TS 138 211 V16.2.0 (Jul. 2020): "5G; NR; Physical channels and modulation (3GPP TS 38.211 version 16.2.0 Release 16)"; (Jul. 2020); relevant sections: "8 Sidelink", "8.3.1 Physical sidelink shared channel"; 5 pages.

Etsi TS 138 212 V16.2.0 (Jul. 2020): "5G; NR; Multiplexing and channel coding (3GPP TS 38.212 version 16.2.0 Release 16)"; (Jul. 2020); relevant section: "8 Sidelink transport channels and control information"; 7 pages.

IEEE Std 802.11-2020; IEEE Standard for Information Technology—Local and Metropolitan Area Networks—Specific Requirements; Part 11: Wireless LAN MAC and PHY Specifications; relevant sections: 17.3.2.1 General (p. 2807) ; 17.3.2.5 Mathematical conventions in the signal descriptions ( pp. 2810-2812); 17.3.3 PHY preamble (SYNC) (pp. 2813-2814); 17.3.4 SIGNAL field (pp. 2814-2816); 17.3.8.2 Outline description (p. 2828); 22 pages; 2020.

U.S. Appl. No. 18/338,795 Non Final Office Action issued on Aug. 20, 2025, 12 pages.

U.S. Appl. No. 18/338,795 Final Office Action issued on Feb. 2, 2026, 12 pages.

* cited by examiner

VEHICULAR COMMUNICATION PROTOCOLS WITH CO-CHANNEL COEXISTENCE AND INTER-SYMBOL INTERFERENCE CALCULATION

CROSS-REFERENCE TO RELATED APPLICATIONS

This application claims the priority under 35 U.S.C. § 119 of European Patent application no. 22305918.9, filed on 24 Jun. 2022, the contents of which are incorporated by reference herein.

TECHNICAL FIELD

Aspects of various embodiments are directed to apparatuses and methods for providing wireless vehicular communications in accordance with various vehicular communications protocols and, more particularly, to vehicular communications with improved co-channel coexistence.

BACKGROUND

Vehicle-to-everything (V2X) communications are used to pass information from a vehicle to another entity, and vice versa. V2X communications can be processed by radio frequency transmitters and receivers coupled to vehicles and infrastructure (e.g., traffic lights, speed limit signs, and roadway information signs). Non-vehicular roadway entities, such as pedestrians and cyclists may carry devices configured to transmit and receive data using V2X communications. V2X communications may, in various deployments, be realized by multiple access layer technologies, such as IEEE 802.11p or bd, Third Generation Partnership Project (3GPP) technologies, Fourth Generation (4G), or Fifth Generation (5G) technologies.

V2X communications occur within communication channels defined within a predetermined communication band. One example is the intelligent transportation system (ITS) band. These channels may be shared with other communications that occur using different (e.g., WiFi) communication protocols. This can result in interference if different communication protocols are used to transmit data at the same time on the same channel. For example, within the intelligent transportation system (ITS) band, C-V2X (e.g., LTE-V2X or NR-V2X) and IEEE 802.11p/bd communications may operate within the same channel and may interfere with one another.

A technique for facilitating coexistence between such protocols may include incorporating preambles of one asynchronous communication technology (e.g., IEEE 802.11-based) into packets of a second synchronous communication technology (e.g., C-V2X) as a mechanism for reserving a particular channel for a period of time. This approach, however, can present difficulties if multiple vehicles of the second technology are transmitting substantially simultaneously in the same geographical region. In that case, the vehicles of the second technology may, substantially simultaneously, each transmit messages that include the same preamble. In that case, there is a possibility that receivers pertaining to the first communication technology perceive those two independent communications as a single communication message although affected by rich multipath channels and large delay spread, which can impede proper decoding of received data communications.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1A:
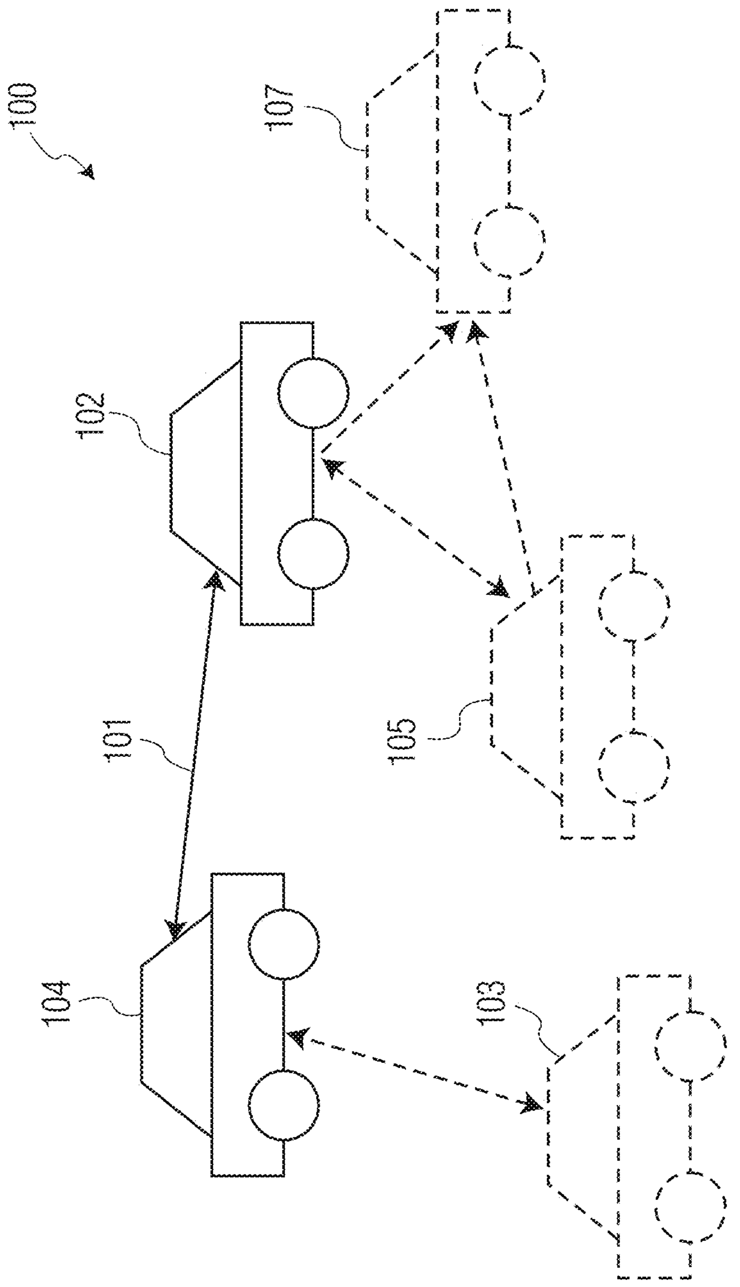
FIG. 1A PRIOR ART
FIG. 1A depicts an example communications network that includes a number of vehicular communication systems.

The following detailed description is merely illustrative in nature and is not intended to limit the embodiments of the subject matter of the application and uses of such embodiments. As used herein, the words “exemplary” and “example” mean “serving as an example, instance, or illustration.” Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Aspects of the present disclosure are believed to be applicable to a variety of different types of apparatuses, systems and methods involving wireless vehicular communications involving vehicular communications protocols. In certain implementations, aspects of the present disclosure have been shown to be beneficial when used in the context of different technologies that operate using different vehicular communications protocols and coexist in the same bandwidth, and that allow for the technologies to be implemented while mitigating interference between the communications protocols. In some embodiments, circuitry operating a signal processing system to process received communications transmitted using a vehicle communication protocol may be configured to implement a specific signal decoding processing algorithm that calls for blanking certain aspects of a received data signal or removing portions thereof to improve the likelihood of successful decoding of a transmitted data packet.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Vehicles, such as automobiles, can include communications circuitry for wirelessly communicating with other vehicles and/or other communications circuitry using vehicular communications protocol, sometimes herein referred to as vehicle-to-everything (V2X) communications. Different V2X technologies can coexist or spectrum-share the same band or channel, such as with WiFi-based and 3GGP-based (fourth generation (4G) LTE-V2X or fifth (5G) NR-V2X) technologies. With the evolution of different technologies, vehicles in operation may be operating using different technologies that co-exist in the same channel of a given band, such as a 10 MHz piece of spectrum, although not necessarily limited to it. As a specific example, WiFi (e.g., IEEE 802.11p) and Third Generation Partnership Project (3GPP) Cellular Vehicle-to-Everything (C-V2X) technologies can be operated by vehicles for transmission of messages between vehicles. As used herein, the terms 'IEEE 802.11' and 'IEEE 802.11p' are used interchangeably as IEEE 802.11 has now been amended to incorporate the 'p' amendment. Example 3GPP technologies include LTE-based technologies, such as Long-Term Evolution Release 14 (LTE Rel-14), Long Term Evolution Release 15 (LTE Rel-15) as well as other technologies, such as Fifth Generation New Radio (5G NR V2X). As both technologies may be used at the same time and in a shared vehicular geographic region, interference between the different radio systems and/or technologies can occur. This may be particularly likely to occur in conditions with limited spectrum such that multiple communications technologies are required to coexist within the same frequency channel(s).

As used herein, interference refers to or includes the collision of two (or more) messages. In the field, various V2X networks can include a plurality of vehicles, each of which includes at least one first vehicular communication circuit or a second vehicular communication circuit used to transmit messages according to the different vehicular communications protocols. A shared vehicular geographic region or shared vehicular geography includes an overlapping geography of two or more vehicles providing V2X communications, such that the two or more vehicles are within each other's range. In some embodiments, the shared vehicular geographic region may cause formation of one or more vehicular ad-hoc networks.

In a specific example, different vehicular communications protocols can operate in the same frequency channel of an intelligent transportation system (ITS) band. Because those protocols may operate differently, co-channel coexistence can be burdensome to implement. For example, a first vehicular communications protocol may allow for messages to be sent synchronously by communication circuits relative to a timing reference and multiple messages can be transmitted at the same time slot by means of allocating different set of subcarriers to different messages. Conversely, messages in accordance with a second vehicular communications protocol may be sent asynchronously. In that case, the second vehicular communications circuitry does not rely on timing references and instead observes (e.g., listens) to the channel and communicates in response to the channel being clear (e.g., no messages being transmitted), with such communications occupying all channel bandwidth so that there only one message sent at a time. As both types of technologies may be deployed to different vehicles within a particular region, V2X communications using the different technologies can occur within proximity to one another potentially causing interference and packet collisions thereby impacting communication performance, as both protocols utilize the same frequency channel.

In some V2X communication systems, co-channel coexistence support may be provided by the first vehicle communications circuitry incorporating a preamble to its communication packets, that includes information that is recognized by the second vehicular communications circuitry that uses the second vehicular communications protocol. The preamble includes the necessary elements so that it can be decoded by the second vehicular communications circuitry, such as training sequences and control information that in turn reserves the channel for ensuing message subframes on the channel as transmitted by the first vehicular communication circuitry. During the implicit reservation time, the second vehicular communications circuitry do not transmit messages, as it is trying to decode what it recognized as a packet of given duration. The preamble is thereby used to temporarily suspend transmissions from the second vehicular communications circuits.

The first vehicular communication circuit (in the proximate geographic area) transmits packets that each include the preamble. The preamble includes elements that are consistent with the second vehicular communications protocol, such as control information that is part of an orthogonal frequency-division multiplexing (OFDM) data symbol (e.g., legacy a signal field (L-SIG) OFDM symbol). In specific embodiments, the preamble includes a legacy short training field (L-STF), a legacy long training field (L-LTF) and an L-SIG OFDM symbol that carries the control information decodable by the second vehicular communications circuitry. The second vehicular communications circuitry recognizes the training sequences in the preamble, then proceeds to decoding the control information (e.g., L-SIG) which indicates a fake packet duration, set to the duration of the transmission of the first communication circuitry packet, which in turn reserves access to the channel for the first vehicular communications circuitry, and refrains the second vehicular communication circuitry from transmitting messages during that time. The second vehicular communications circuitry may or may not be able to decode the remaining data transmitted by the first vehicular communications circuitry, but in either embodiment, would not transmit message during the reservation time.

To illustrate, FIG. 1A depicts an example communications network that includes a number of vehicular communication systems. As illustrated, the network 100 includes a plurality of vehicles 102, 103, 104, 105, 107, each of which includes at least one of first vehicular communications circuitry or second vehicular communication circuitry used to transmit messages according to vehicular communications protocols.

The network 100 includes a V2X network used to provide V2X communications. V2X communications includes four types of communications: vehicle-to-vehicle (V2V), vehicle-to-infrastructure (V2I), vehicle-to-network, (V2N) and vehicle-to-pedestrian (V2P). In specific instances, a V2X network 100 may enable an exchange of information between a plurality of vehicles and, in some instances, other devices. As may be appreciated, as used herein "circuitry" refers to one or more circuits, such as a plurality of similarly operating (or version of) circuits operating in respective vehicles.

The vehicles 102, 103, 104, 105, 107 can communicate messages to one another, such as speed measurements, communication measurements, GPS data, etc., via the communications circuits. Vehicles 102, 103, 104, 105, 107 may use V2V for a variety of use cases, such as emergency electronic brake light, emergency vehicle approaching notification or collision avoidance but not limited thereto, where both parties of the communication have circuitry equipped on different vehicles.

Different vehicles may utilize different technologies for performing the V2X communications that operate using different vehicular communications protocols. For example, a first plurality of vehicles 102, 105, 107 use technology A to communicate according to a first vehicular communications protocol and a second plurality of vehicles 103, 104 use technology B to communicate according to a second vehicular communications protocol. The technology A can include a 3GPP C-V2X technology, such as an LTE-based communication (e.g., LTE REL-14, LTE Rel-15) or a 5G NR V2X-based communication.

As the vehicles 102, 103, 104, 105, 107 are not fixed in location, the first and second vehicular communications protocols co-exist in the same channel and the vehicles operating the different technologies can be within geographic proximity to one another, such that interference (e.g., collision) between the communications can occur. In such conditions, as described herein, approaches to mitigate and/or avoid such interference by temporal separation of the communications by signaling to technology B devices prior to communication by technology A devices. For ease of reference, vehicular communications circuitry is interchangeably herein referred to as communications circuitry.

As described above, the first and second vehicular communications protocols operated by the first and second communications circuitry exist in the same channel. The first communications circuitry can use technology A. In specific embodiments, technology A is a 4G technology or other 3GPP-type technology, such as 5G-NR. The technology A devices (e.g., vehicles 102, 105, 107) each include a first communications circuit that communicates wirelessly using a first vehicular communications protocol. For example, the first vehicular communications protocol can be consistent with LTE-based communications, such as LTE-V2X communications. The first vehicular communications protocol allows for messages to be sent synchronously by circuits relative to a timing reference. The first communications circuitry can communicate messages as a plurality of message subframes.

3GPP V2X is a synchronous system. All users are assumed to be synchronized on a common reference timing such as Global Navigation Satellite System (GNSS). Use of LTE or other 3GPP protocols obviates the use of synchronization preambles (compared to IEEE 802.11), which may reduce overhead. As an example, LTE-based communications transmit messages as a set of OFDM data symbols. As 3GPP V2X communications is a synchronous system, a plurality of LTE-based or other 3GPP-based communications can be transmitted at the same time. Additionally, as further described below, transmitting messages without a preamble sequence prefix, the first symbol of each subframe might not be available for channel decoding at the receiver, because it might be used for automatic gain control (AGC) calibration purposes, a phase during which the receiver's transceiver gain is being adjusted to match the required input dynamic expected by the analog to digital converter (ADC).

The second communications circuitry can use technology B to communicate between vehicles. In specific embodiments, technology B is a WiFi-based technology, such as IEEE 802.11p. The label 802.11p or WiFi is sometimes used throughout the text referring to when the dot11OCBActivated is set to true enabling communication outside the context of a BSS in IEEE 802.11-2016. The technology B devices (e.g., vehicles 103, 104) each include a second communications circuit that communicates wirelessly using a second vehicular communications protocol with is consistent with IEEE 802.11p or IEEE 802.11bd-based communications. The second vehicular communications protocol allows for messages to be sent asynchronously. For example, second communications circuitry can observe (e.g., listen) to the channel and communicate in response to the channel being clear (e.g., no messages being transmitted). As different vehicles in the field may include either type of technology and V2X communications using the different technologies that occur within proximity to one another, communications using both technologies can cause collisions as both protocols utilize the same bandwidth. The technology A devices (e.g., vehicles 102, 105, 107) can avoid or mitigate interference by the first communications circuitry adding a preamble to messages communicated and that the second communications circuitry recognizes data 101 in the preamble. More specifically, the data 101 can be added to the first symbol which is not used for data transmission by the first vehicular communications protocol. The preamble de-facto provides a reservation time for ensuing message subframes on the channel and in accordance with the second vehicular communications protocol. During the reservation time, the second communications circuitry does not transmit messages, as further described herein. In such a manner, the preamble suspends transmissions from the second communications circuits.

Figure 1B:
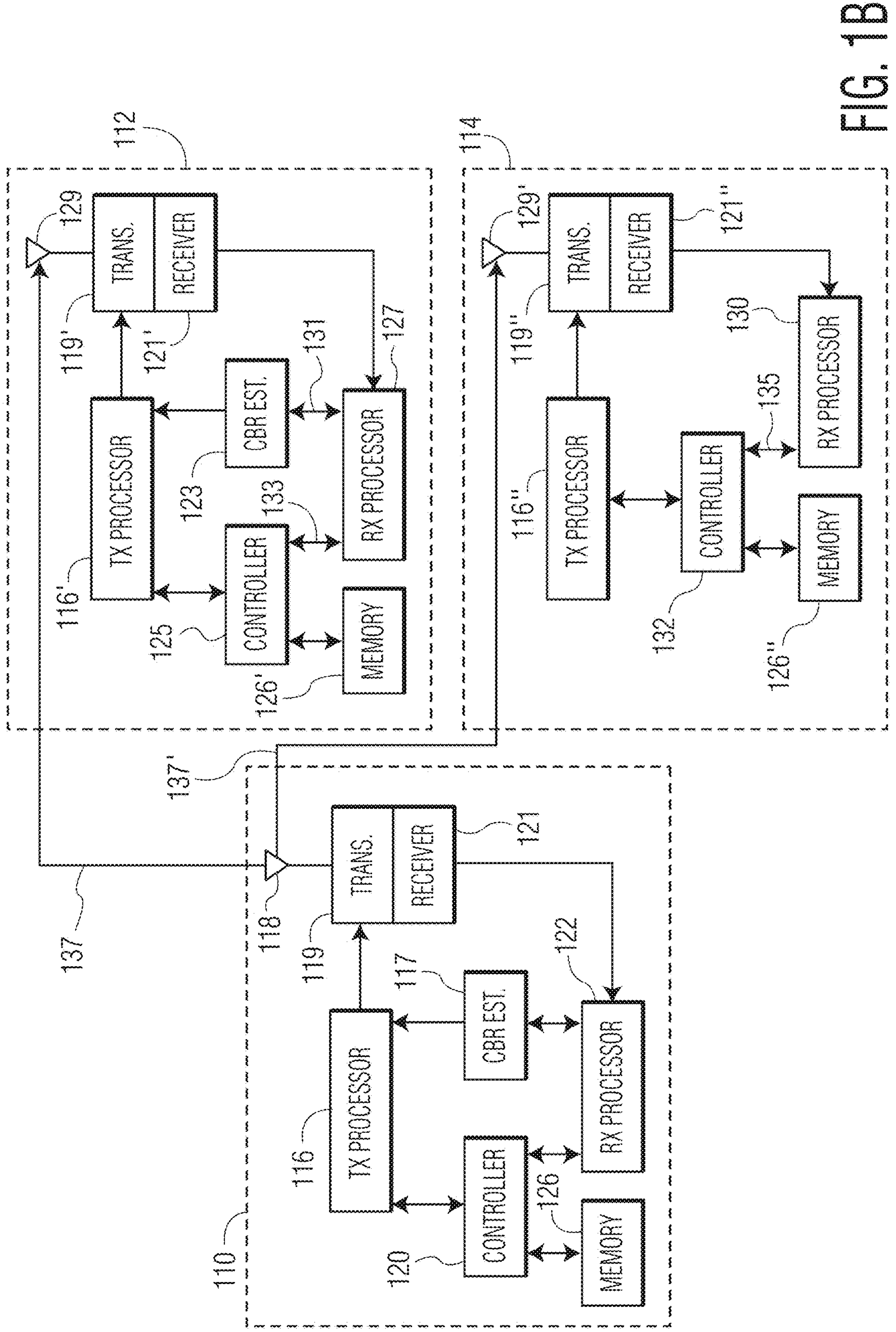
FIG. 1B PRIOR ART
FIG. 1B illustrates example first communications circuitry and second communications circuitry, in accordance with various embodiments.

FIG. 1B illustrates example first communications circuitry and second communications circuitry configured for V2X communications, in accordance with various embodiments. More specifically, FIG. 1B illustrates two first communications circuitries 110, 112 (e.g., two circuits located in two different vehicles), and second communication circuitry 114. The first communication circuitry 110 is transmitting data over a channel, which is received by the other first communications circuitry and/or the second communication circuitry 114.

As shown, both the first communications circuitries 110, 112 and the second communication circuitry 114 include common circuitry. For ease of reference, only each of the first communication circuitry 110 components are described, although as may be appreciated, both circuits 110, 112 (as well as the second communications circuitry 114) include similar or identical components. The first communication circuitry 110 includes a transmit (TX) processor 116 and receive (RX) processor 122 used to implement various functionality for transmitting and receiving messages in accordance with the first vehicular communications protocol. As may be understood by one of ordinary skill, the TX processor 116 can map to signal constellations based on various modulation schemes (e.g., binary phase-shift keying, quadrature phase-shift keying, M-phase-shift-keying, etc.). The coded and modulated symbols are mapped to an OFDM subcarrier and used to produce a physical channel carrying a time domain OFDM symbol stream. The stream is provided to the antenna 118 via a transmitter (TX) 119.

The receiver (RX) 121 receives a signal through the antenna 118. Although the embodiments illustrate a single antenna, embodiments are not so limited and can include separate RX and TX antennas and/or different antennas for different streams. The RX 121 recovers IQ samples onto the RF carrier and provides the IQ samples to the RX processor 122. The RX processor 122 converts the IQ samples stream from the time-domain to subcarriers in the frequency domain using a Fast Fourier Transform (FFT) and uses the same to recover data and control signals which are provided to the controller/processor 120. The controller/processor 120 processes data received in data messages and can be associated with memory 126 that stores program codes and data.

In various embodiments, the first communications circuitry 110 further includes a channel busy ratio (CBR) estimator circuit 117. The CBR estimator circuit 117, as further described herein, can be used to determine a CBR metric and/or a fairness criterion and which is communicated to other first communication circuits (e.g., circuitry 112).

The second communication circuitry 114 includes a transmit (TX) processor 116" and receive (RX) processor 130 used to implement various functionality for transmitting and receiving messages in accordance with the second vehicular communications protocol, e.g., a WiFi-based communication (e.g., IEEE 802.11p). Messages are provided by the TX processor 116" to the antenna 129' for wirelessly communicating via the TX 119". The RX 121" receives a signal through the antenna 129' and provides recovered data to the RX processor 130, similarly to that described above and as would be appreciated by one of ordinary skill. The RX processor 130 converts the data stream to recover the data and provides the same to the controller/processor 132. The controller/processor 132 processes data received in data messages and can be associated with memory 126" that stores program codes and data.

In specific embodiments, the first communications circuitry 110 communicates wirelessly using the first vehicular communications protocol in which messages are sent synchronously relative to a timing reference, e.g., an LTE or other 3GPP-based communication. Each transmitted message 137, 137' by the first communications circuitry 110 (as well as the other first communication circuitry 112) includes elements that are consistent with the second vehicular communications protocol. The control information is part of a preamble of the message, and which can be provided in the first symbol of the subframe. The second communications circuitry 114 can recognize/interpret the data in the message 137, 137'. For example, the data in the message 137, 137' indicates a reservation time to the second communications circuitry 114. During the reservation time, the first communications circuitry 110 (and potentially other first communication circuits) transmits message subframe(s) and the second communications circuitry 114 (and other proximate second communication circuits) refrains from transmitting. The data thereby reserves transmission time for the first communication circuitry and suspends transmissions from second communication circuitry for the duration of the reservation time.

As a specific example, the first communications circuitry 110 transmits the message 137, 137' (e.g., IEEE 802.11 preamble during the first 40 μs, and the regular LTE-V2X samples for the rest of the packet) which is received by both the second communications circuitry 114 and the other first communication circuitry 112. The message 137, 137' includes the data as part of a preamble that is consistent with the second vehicular communications protocol. The second communications circuitry 114 receives the message 137' including the data via the antenna 129' and RX 121", and the RX processor 130 extracts the data in the preamble and provides the remaining portion of the message 135 to the controller/processor 132 (e.g., a WiFi decoder). The controller/processor 132 may attempt to decode the data in the remaining portion of the message 135, and in some instances, may be unable to as the data is communicated in accordance with the first vehicular communications protocol. As the second communications circuitry 114 is able to extract the data in the preamble, the second communications circuitry 114 refrains from transmitting data during the reservation time encoded in the data.

The other first communications circuitry 112 also receives the message 137 and interprets the data in the message 137. As further described herein, the message includes a preamble consistent with the second vehicular communications protocol, additional data encoded in accordance with the first vehicular communications protocol, and channel-usage indication or channel-usage state (e.g., communicated as a DMRS). The channel-usage indication or channel-usage state is used to monitor devices communicating in the bandwidth to dynamically derive a fairness criterion, as further illustrated herein. The transmitted message is received by the antenna 129 and RX 121' of the other first communications circuit 112 and provided to the RX processor 127. The RX processor 127 extracts the data components (e.g., LTE data 133) and the channel-usage data or state (e.g., DMRS 131). The RX processor 127 provides the data component (e.g., LTE data 133) to the controller/processor 125 (e.g., to the LTE data decoder), and the channel-usage indication or state (e.g., DMRS 131). to the CBR estimator circuitry 123, for further processing as described herein. Although the embodiment of FIG. 1B illustrates the CBR estimator circuitry 123 as being separate from the controller/processor 125, embodiments are not so limited and the CBR estimator circuitry 123 can be component of the controller/processor 125.

The first communications circuitry 110 can be part of an apparatus that includes the first vehicular communications circuitry including at least one communications circuit (e.g., various circuits are further described below). As described above, the first communications circuitry 110 including the at least one communications circuit is configured in a vehicle and configured to communicate wirelessly by using a first vehicular communications protocol in which respective messages are sent synchronously relative to a timing reference, and including, as part of each transmitted message, data which is consistent with another vehicular communications protocol in which respective messages are sent asynchronously on behalf of other vehicular communications circuits and which indicates to the other vehicular communications circuits a reservation time for ensuing message subframes during which the other vehicular communications circuits are not to transmit.

In various specific embodiments, the first communications circuitry 110 communicates wirelessly using the first vehicular communications protocol by, for each message transmitted according to the first vehicular communications protocol, transmitting the message including control information which is consistent with a second vehicular communications protocol in which respective messages are sent asynchronously on behalf of other vehicular communications circuits. In one or more embodiments, the vehicular communications circuitry is further configured to include the preamble, as part of a symbol in each transmitted message, which is consistent with the second vehicular communications protocol in which respective messages are sent asynchronously on behalf of other vehicular communications circuits, and which indicates to the other vehicular communications circuits a reservation time for ensuing message subframes during which the other vehicular communications circuits are not to transmit. For example, the first vehicular communications protocol is a protocol consistent with LTE-V2X or 5G NR-V2X-based communications, and the second vehicular communications protocol is a protocol consistent with WiFi or IEEE 802.11p communications, wherein the first vehicular communications circuitry includes a plurality of similarly operating circuits operating in respective vehicles.

In a specific embodiment, a vehicle communication circuit may be configured to transmit V2X data packets encoded according to the LTE-V2X protocol, where the packets incorporate a specific header configured to reserve a communication channel for a time period. For communications occurring within the ITS band, for example, this may involve incorporating an IEEE 802.11p preamble that can specify that the channel will be in use by the LTE-V2X stations for a given time (e.g., 1 millisecond). Such header, once transmitted, can be decoded by ITS-G5 receiving stations, which can subsequently back off from using the channel (e.g., transmitting their own data) during this specified time frame.

For this approach to enable proper decoding of such transmissions, it can be important that the ITS-G5 receiving stations achieve a satisfactory decoding performance of the ITS-G5 preamble information and, specifically, of the L-SIG field portion of the preamble transmitted by the LTE-V2X stations, to enable avoidance of packets collisions. In circumstances where multiple LTE-V2X stations each transmit messages within a short period time that include the same preamble to request access to the same channel, there is a risk that receiving devices may perceive those two independent V2X communications as a single significantly delayed multipath channel communication, which can impede proper decoding of received data communications.

In the majority of cases, OFDM is utilized to encode aspects of V2X communications. OFDM has some variations (e.g., LTE-V2X may utilize a multiple user access scheme), but the underlying principle of OFDM communications is common across all such system. That is, modulation symbols (e.g., QPSK, QAM . . . ) are encoded in the frequency domain by a transmitting device, and converted to the time domain by an inverse Fourier transform (such as an IFFT operation) executing at the receiving device.

Figure 2:
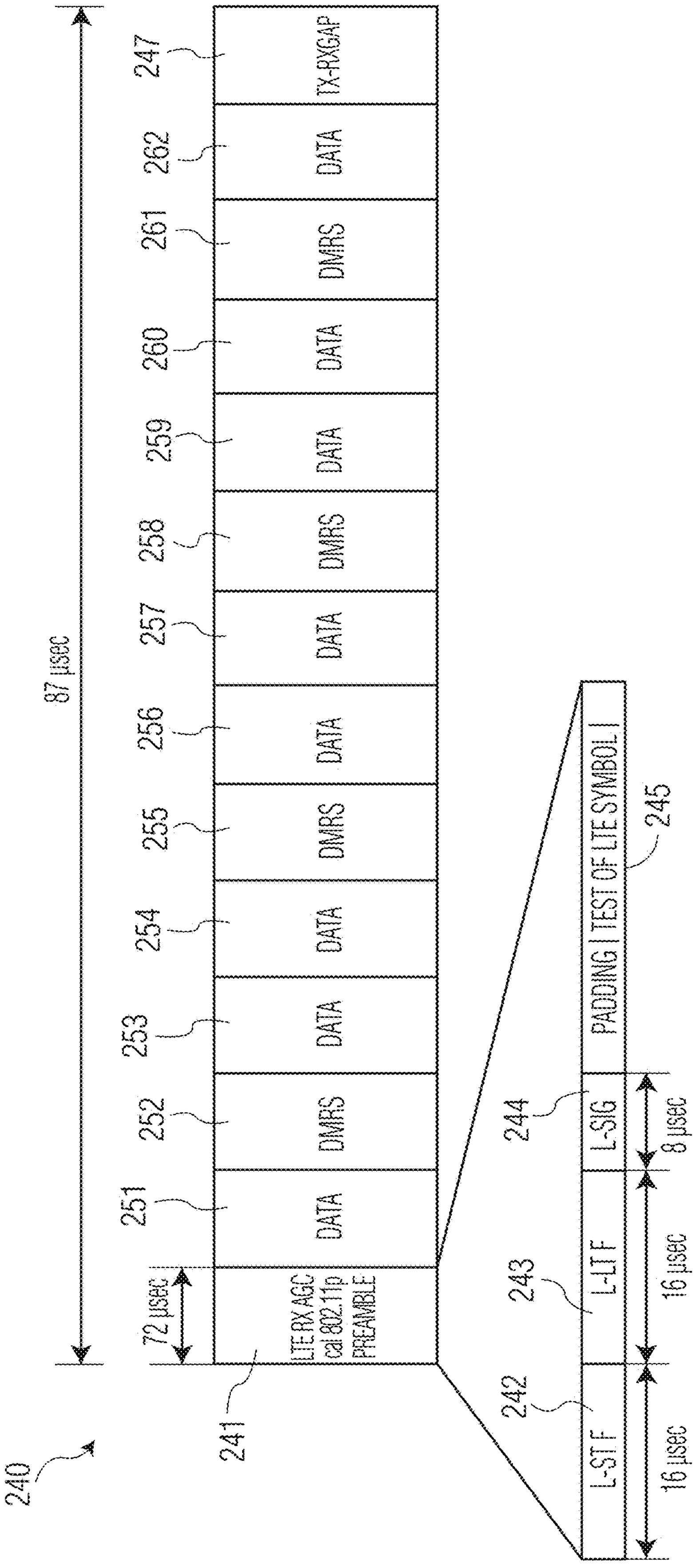
FIG. 2 PRIOR ART
FIG. 2 illustrates an example C-V2X data message that may be communicated by an apparatus in accordance with the present disclosure, where the data message can include an IEEE 802.11p header.

FIG. 2 illustrates an example data message that may be communicated by a communication circuitry apparatus in accordance with the present disclosure. As illustrated by FIG. 2, the data message 240 may be wirelessly communicated by first communications circuitry using a first vehicular communications protocol. As previously described, the data messages in accordance with the first vehicular communications protocol can occur for one subframe and can include an adapted first symbol, e.g., first OFDM symbol 241 that comprises a preamble including L-SIG field data 244 that can be read and understood by second communications circuitry. The data 244 can indicate a reservation time to the second communications circuitry during which time the first communications circuitry communicates ensuing message subframe(s) and the second communications circuitry does not transmit.

The data message 240 can include a data subframe, which may comprise fourteen OFDM symbols. A first symbol 241 in the data subframe may be used for specifying channel configuration. The data subframe may include a physical Sidelink shared data channel (PSSCH) and a physical Sidelink control channel (PSCCH), which are both transmitted during the same symbol indexes (0, 1, 3, 4, 6, 7, 9, 10, 12) although on a different set of subcarriers. Separating pairs of the PSSCH and PSCCH symbols (e.g., data at symbols 251, 253, 254, 256, 257, 259, 260, 262) are DMRS (demodulation reference signal symbols) (e.g., DMRS at symbols 252, 255, 258, 261).

The first OFDM symbol 241 is modified to hold a preamble that is in accordance with the second vehicular communications protocol (e.g., WiFi-based protocol). The preamble includes various data block 242, 243, 244, 245. For example, the preamble includes a legacy short training field (L-STF) 242 that provides support of synchronization and AGC calibration (e.g., which can be 16 microseconds (μs) long), a legacy long training field (L-LTF) 243 that provides channel estimation pilot for decoding subsequent L-SIG and PSDU section symbols (e.g., IEEE 802.11p OFDM symbols and which can be 16 μs), and the L-SIG field 244 (e.g., which can be 8 μs) that contains control information such as the data rate and packet length, which in turns indicates a reservation time. The L-SIG field data 244, more specifically, includes a L-SIG OFDM symbol that conveys the modulation and coding scheme (MCS) and a packet length which can be converted to a packet duration, thereby reserving the channel for such time. The preamble additionally includes padding 245 which can include white noise and/or another data symbol.

With this preamble, the first communications circuitry reserves the channel for communications in accordance with the first vehicular communications protocol (e.g., for LTE-V2X purposes). As described above, the reservation time can be indicated by the included information as part of an OFDM symbol, such as a L-SIG OFDM symbol that allows for the reservation of the channel to be performed seamlessly by indicating in the L-SIG of this header. The second communications circuitry can decode the information in preamble and refrain from sending messages during the indicated reservation time.

Figure 3:
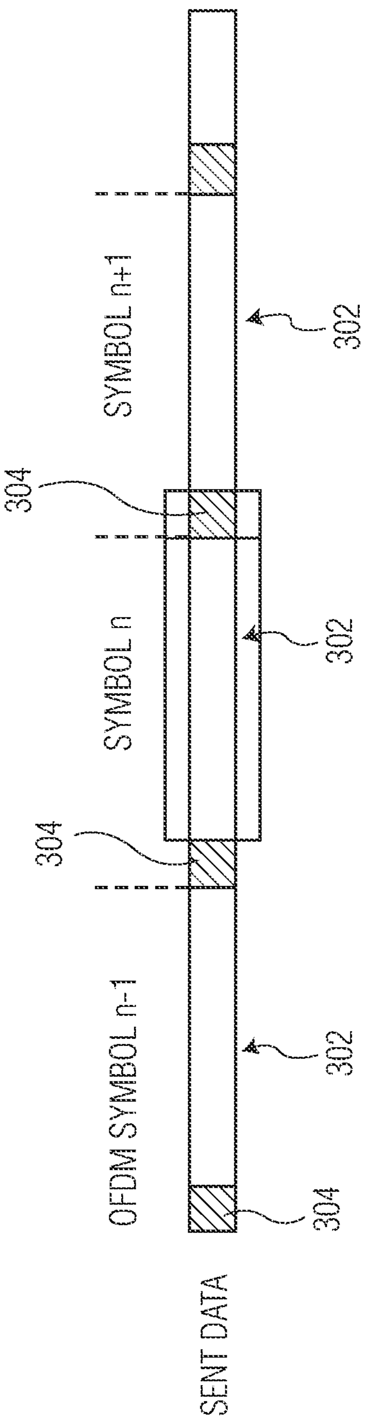
FIG. 3 is a block diagram depicting a number of orthogonal frequency-division multiplexing (OFDM) symbols with appended cyclic prefix (CP) elements.

In the time domain, a cyclic prefix (CP), which may also be referred to as a "guard time," is appended to the beginning of each OFDM time domain symbol. This is illustrated in FIG. 3, which depicts a number of OFDM symbols with appended CP elements. Specifically, FIG. 3 depicts three OFDM symbols 302. Each symbol 302 includes a respective CP 304 that has been appended at the beginning of each OFDM symbol 302. The CPs 304 are used to avoid inter-symbol interference (ISI). Each CP 304 is generated by copying a portion of the In-phase (I) and Quadrature-phase (Q) (IQ) samples at the tailing end of the relevant OFDM symbol 302 and then appending that copied portion as the CP 304 at the beginning of the OFDM symbol 302. Each CP 304 is configured to enable absorption of signal delays (e.g., delay taps) that could occur due to multi-path transmission delays.

In various asynchronous communication networks, the incorporation of CP 304 into each OFDM symbol 302 is configured to absorb only the delay spread of the multipath fading channel. Each transmitted packet includes at its beginning a preamble, which is used by the receiving device to identify the start of a packet, and synchronize in time and in frequency, before proceeding with the decoding of the data section of the packet. In contrast, in synchronous communication networks, such as C-V2X (C-V2X meaning 4G LTE-V2X or 5G NR V2X), the transmitter and receiver devices are assumed to be synchronized in time and frequency (typically by means of GNSS). Therefore, the C-V2X packets do not include a preamble, and instead start directly with OFDM data. Thus, the goal of the CP is slightly different in these data transmissions, as the CPs are meant to absorb not only the delay spread, but also propagation delay and time-synchronization errors. Thus, in LTE-V2X systems, CP duration is by design larger than for IEEE 802.11p systems. Table 1, below, provides a summary of usage of CPs in asynchronous (e.g., IEEE 802.11p) networks versus synchronous (e.g., LTE-V2X) networks, for 10 MHz channels.

TABLE 1

Cyclic prefixes purposes for IEEE 802.11p and LTE-V2X

| | IEEE 802.11p | LTE-V2X |
|---|---|---|
| CP duration | 1.6 μs | 4.69 μs |
| CP purpose | Delay spread | Delay spread + propagation delay + time sync errors |

In typical LTE-V2X communication systems, the 10 MHz communication channel is organized as 5 subchannels of 10 resource blocks (RBs) each. These 5 subchannels may hold one or several users, depending on the size of the data packets to be transmitted. Consequently, during normal operations and for normal V2X-type packets (e.g., ITS-G5 standard messages, such as cooperative awareness messages (CAMs) typically having data payloads ranging from 200 to 550 bytes, collective perception messages (CPMs), or maneuver coordination messages (MCMs)) there can be one, two or three users transmitting data in the same LTE-V2X subframe, assuming that such users are relatively geographically close to one another and avoiding frequency re-use.

This situation can lead to circumstances in which multiple LTE-V2X users may substantially simultaneously transmit messages that each include identical IEEE 802.11p header portions of the respective LTE-V2X data packets, potentially creating a complex 'distributed antennas' type of fading channel from the IEEE 802.11p receiver's perspective. This can be exacerbated given that in typical ITS applications, the distances between various transmitters (e.g., vehicles that may be moving with respect to one another and the receiving device) and a receiving device can be variable. Varying distances between transmitting devices and the receiving device (e.g., a distance between a first transmitting device and the receiving device (TX1-RX) and the distance between a second transmitting device and the same receiving device (TX2-RX)) will yield different propagation times of the respective transmitted signals, translating into a relative time-offset between signals received from the first transmitting device TX1 and signals received from the second transmitting device TX2, as perceived by the receiving ITS-G5 receiver RX. Table 2 provides examples of the relationship between relative distances and relative time offsets.

TABLE 2

Time offset, distances and propagation path losses figures

| Relative distance delta between TX1-RX & TX2-RX | Relative time offset between TX1-RX & TX2-RX |
|---|---|
| 0 meters | 0.0 μs |
| 300 meters | 1.0 μs |
| 450 meters | 1.5 μs |
| 600 meters | 2.0 μs |
| 1200 meters | 4.0 μs |

This relative time delays introduced by transmitters at varying distances may not be adequately accounted for in the CP implementation in communication protocols such as IEEE 802.11p. In that communication protocol, the CP has a duration of 1.6 μs, which is configured to only absorb delay spread and does not account for larger delays that may occur due to relative distance between multiple transmitters being greater than 400-450 meters. Consequently, in such communication protocols, signal delays due to transmitter distance can result in poor signal decoding for IEEE 802.11p receivers where encoded OFDM symbols in received signals are not adequately protected by the conventional CPs, with ISI likely to result.

Figure 4:
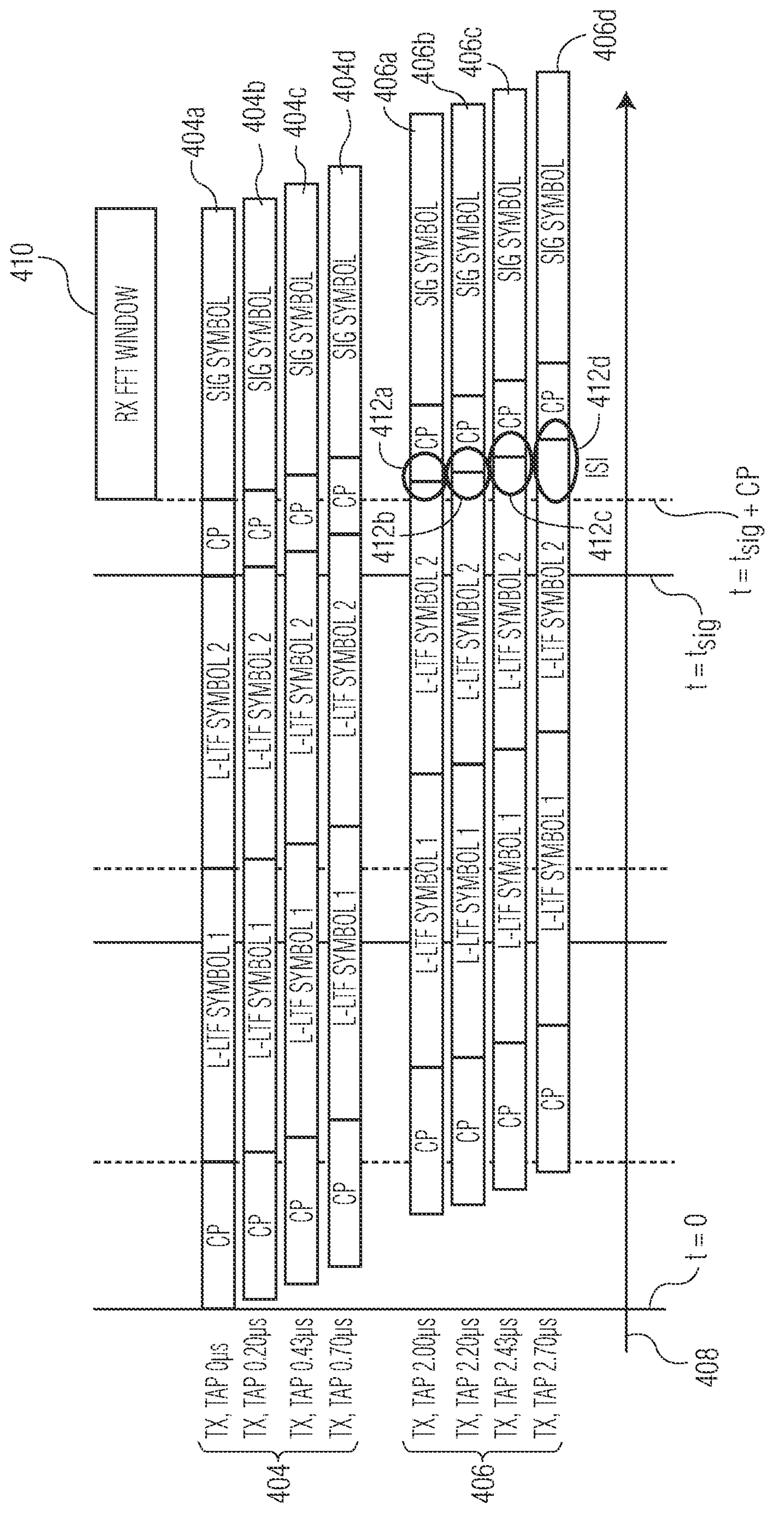
FIG. 4 is a timing diagram depicting receipt of a signal comprising two data packet transmissions where the transmissions are generated by two independent transmitters having an exemplary 2 μs relative delay.

To illustrate this problem, FIG. 4 is a timing diagram depicting receipt of a signal comprising two data packet transmissions where the transmissions are generated by two independent transmitters having 2 μs of relative delay, as perceived by a receiving device. The timing diagram of FIG. 4 depicts the timing of the receipt of the two independent data packet transmissions as observed by the receiving device. The header inserted by the two transmitting devices into each data packet transmission is encoded as per a given protocol (e.g., IEEE 802.11p) and includes the same information in the L-SIG container portion of the data packets, meaning that portion indicates the same packet duration (e.g., 1 ms), as regulated by the protocol (e.g., ETSI ITS-G5). As such, the headers in each packet are identical (i.e., they include the same L-STF, L-LTF and same control information L-SIG), and the receiving device interprets the two received transmissions as being of the same data packet from a single transmitting device, simply transmitted via a rich fading channel with significant delay spread (e.g., greater than 1.6 μs).

In FIG. 4, packet 404 represents a portion of a first data packet transmitted by a first transmitting device in the current scenario. As illustrated, received packet 404 comprises a number of received delay taps **404*a*-404*d* of packet 404 that may be attribute to multi-path delays or echoes of the original transmission. The time-leading channel tap 404*a* may relate to a line-of-sight (LOS) path, or to an echo in case the LOS path is blocked. Packet 406 represents a portion of a second data packet transmitted by a second transmitting device in the current scenario and received by the receiving device. As illustrated, received packet 406 comprises a number of delay taps 406***a*-406*d* that may be attribute to multi-path delays or echoes. Similarly, the time-leading channel tap 406*a* may relate to a line-of-sight (LOS) path, or to an echo in case the LOS path is blocked. To illustrate the various receipt delays in packets 404 and 406, the horizontal axis 408 of the timing diagram of FIG. 4 represents time and so depicts how the reception of packet 406 and, specifically, taps 406*a*-406*d* of packet 406 is delayed as compared to the reception of packet 404 and, specifically, taps 404*a*-404*d*.

As illustrated, at time t=0, the RF signal received by the receiving device includes a first instance 404*a* of packet 404. Exemplary additional taps of packet 404 occur at delays of 0.20 µs (tap 404*b*), 0.43 µs (tap 404*c*), and 0.70 µs (tap 404*d*). A time t=2.00 µs, the signal received by the receiving device includes a first tap 406*a* of the second packet 406. Additional taps of packet 406 are received at delays of 2.20 µs (tap 406*b*), 2.43 µs (tap 404*c*), and 2.70 µs (tap 406*d*).

After receiving the RF signal that comprises the various taps of packets 404 and 406, the receiving device is configured to process the received signal by decoding the received L-STF and L-LTF fields encoded into packets 404 and 406 by first detecting the beginning of the packet transmission (i.e., the time at which the L-STF field of the first tap 404*a* of packet 404 is received), determining the L-STF and L-LTF fields, and then using the L-STF and L-LTF to perform synchronization. The receiving device can then perform L-SIG field decoding on the L-SIG symbol portion of the received signal (among other actions). The portion of the received signal that is processed as part of this decoding is determined based upon fixed time intervals following initial receipt of the first instance 404*a* of packet 404 at a time designated by the receiving device as t=0, as depicted in FIG. 4.

Specifically, the receiving device determines that the L-SIG field of the received packet begins at time $t=t_{SIG}$, and will place its FFT window at an offset equivalent to the CP duration at the beginning of the L-SIG field data (i.e., $t=t_{SIG}$+CP) and for the duration of the L-SIG field (e.g., 8 µs minus the CP duration of 1.6 µs). Accordingly, the portion of the received signal that was received between time $t=t_{SIG}$+CP and time $t=t_{SIG}$+CP+6.4 µs is processed via a Fourier transform (FFT) operation to convert the time domain IQ samples captured during that time interval into frequency domain subcarriers elements. The portion of the received signal that will be processed in this manner is that which falls within the time duration labeled on FIG. 4 as element 410.

As illustrated in FIG. 4, the CP blocks incorporated in the L-SIG OFDM symbol in packet 404 are adequate to prevent ISI, even in the delayed taps 404*b*, 404*c*, and 404*d*. That is, the durations of the CP blocks are greater than the delay between the first tap 404*a* of packet 404 and the last tap 404*d* of packet 404.

In contrast, however, the CP blocks incorporated in the L-SIG OFDM symbol in packet 406 are not adequate to prevent ISI. As illustrated by circles 412*a*-412*d*, in each tap 406*a*, 406*b*, 406*c*, and 406*d* of packet 406, at least a portion of the preceding L-LTF symbols has been delayed by a time period greater than the duration the IEEE 802.11p CP duration, such that at least a portion of the L-LTF symbols of each tap 406*a*, 406*b*, 406*c*, and 406*d* is received after $t=t_{SIG}$+CP.

Consequently, when the receiving device attempts to decode the L-SIG symbol out of the received IQ signal that comprises the combination of packets 404 and 406 and their respective taps or echoes, some amount of L-LTF data will be incorporated into the information being decoded. This will corrupt the L-SIG OFDM symbol IQ samples, creating ISI, and can increase the risk that the L-SIG control information is not properly decoded, potentially resulting in communication system errors.

To mitigate problems associated with the processing of such delayed transmissions in V2X environments, the present disclosure provides an improved scheme for decoding L-SIG symbols in received RF signals. In embodiments, the scheme involves, when processing L-SIG symbols, blanking (e.g., perform nulling, or zeroing-out) a number of IQ samples (i.e., values) at the beginning of the L-SIG OFDM symbols, where there is some likelihood those initial values may be corrupted by long multipath channel ISI spill-over from preceding L-LTF symbols. By blanking or setting to zero a certain number of the initial values in the L-SIG symbol data, data corruption caused by ISI can be mitigated while still enabling successful decoding of the L-SIG symbol data. This approach is illustrated in FIG. 5.

Figure 5:
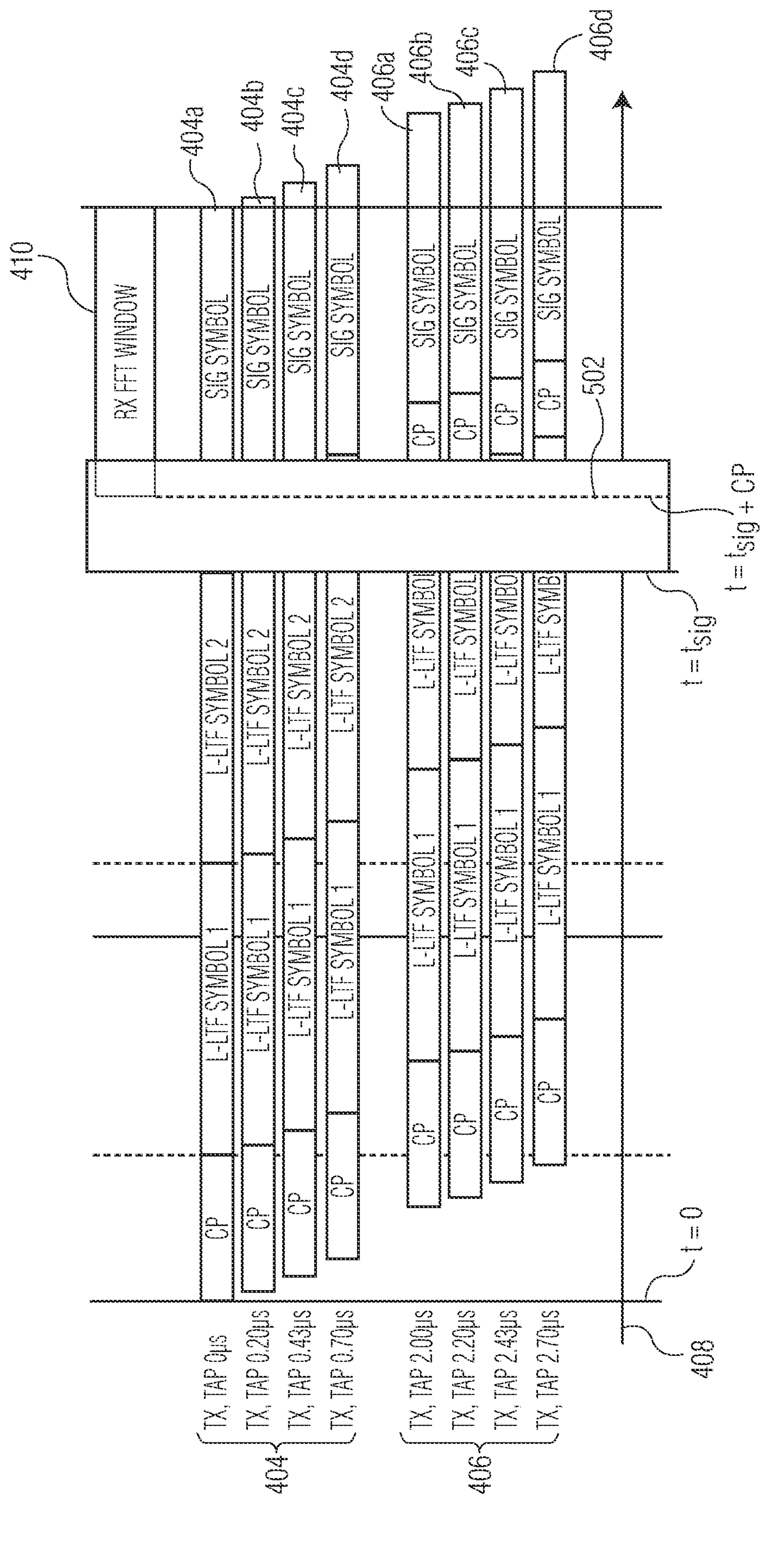
FIG. 5 shows the timing diagram of FIG. 4 modified to depict a number of In-phase (I) and Quadrature-phase (Q) (IQ) samples in received signal data being set to zero values as an approach for mitigating errors generated by inter-symbol interference (ISI).

FIG. 5 shows the timing diagram of FIG. 4 modified to depict a number of IQ samples in received signal data being set to zero values as an approach for mitigating errors generated by ISI. With reference to FIG. 5, in the time domain, starting at time $t=t_{SIG}$+CP a number of measured IQ values are forced to zero values. As depicted in FIG. 5, IQ samples falling with the time period designated by block 502 are set to zero values. With those IQ values set to 0, the receiving device attempts to decode the L-SIG symbol using the conventional Fourier transform approach. Although some data values have been set to zero, decoding may be successful, as long as the remaining IQ samples yield a good signal-to-noise (SNR) ratio, as perceived in the frequency domain. In fact, the likelihood of successfully decoding the L-SIG field is increased compared to the situation with corrupted IQ samples, as the blanked IQ values have removed (some of) the L-LTF symbol ISI that was observed in the timing diagram of FIG. 4.

Depending upon the circumstances, it may be necessary or preferable to blank a different number of IQ samples at the beginning of the L-SIG symbol to achieve an optimum decoding. For example, depending upon the time-domain spread of the received packets or the taps of an individual packet transmission it may be necessary to blank a reduced or a greater number of IQ samples to achieve desired decoding of the L-SIG field.

Accordingly, in an embodiment of the present system, an approach for decoding a received signal may comprise generating multiple candidate decodings of a received L-SIG field in which different numbers of IQ samples at the beginning of the L-SIG OFDM symbol (e.g., starting at time $t=t_{SIG}$+CP) are set to zero values in each candidate decoding. Then, one of the candidate decodings can be selected as an optimal decoding and utilized for message processing going forward.

For example, multiple candidate decodings of L-SIG field may be generated with different numbers of blanked IQ samples (e.g., 5, 10, 15, 20 . . . 50). Each candidate decoding can then be inspected to see if the candidate decoding satisfies proper formatting requirements for L-SIG control information. If so, that indicates that the candidate decoding is likely a valid and non-corrupted candidate decoding of the L-SIG field. One of the successful candidate decodings that satisfies the L-SIG field formatting requirements is then selected as the proper L-SIG decoded information bits. Any suitable selection criteria may be utilized to select one of the properly formatted candidate decodings as the proper decoding. In an embodiment, for example, this may involve selecting the candidate decoding that both satisfies the L-SIG field formatting requirements and utilized a minimum number of blanked IQ values to be designated as the properly decoded L-SIG field.

Figure 6:
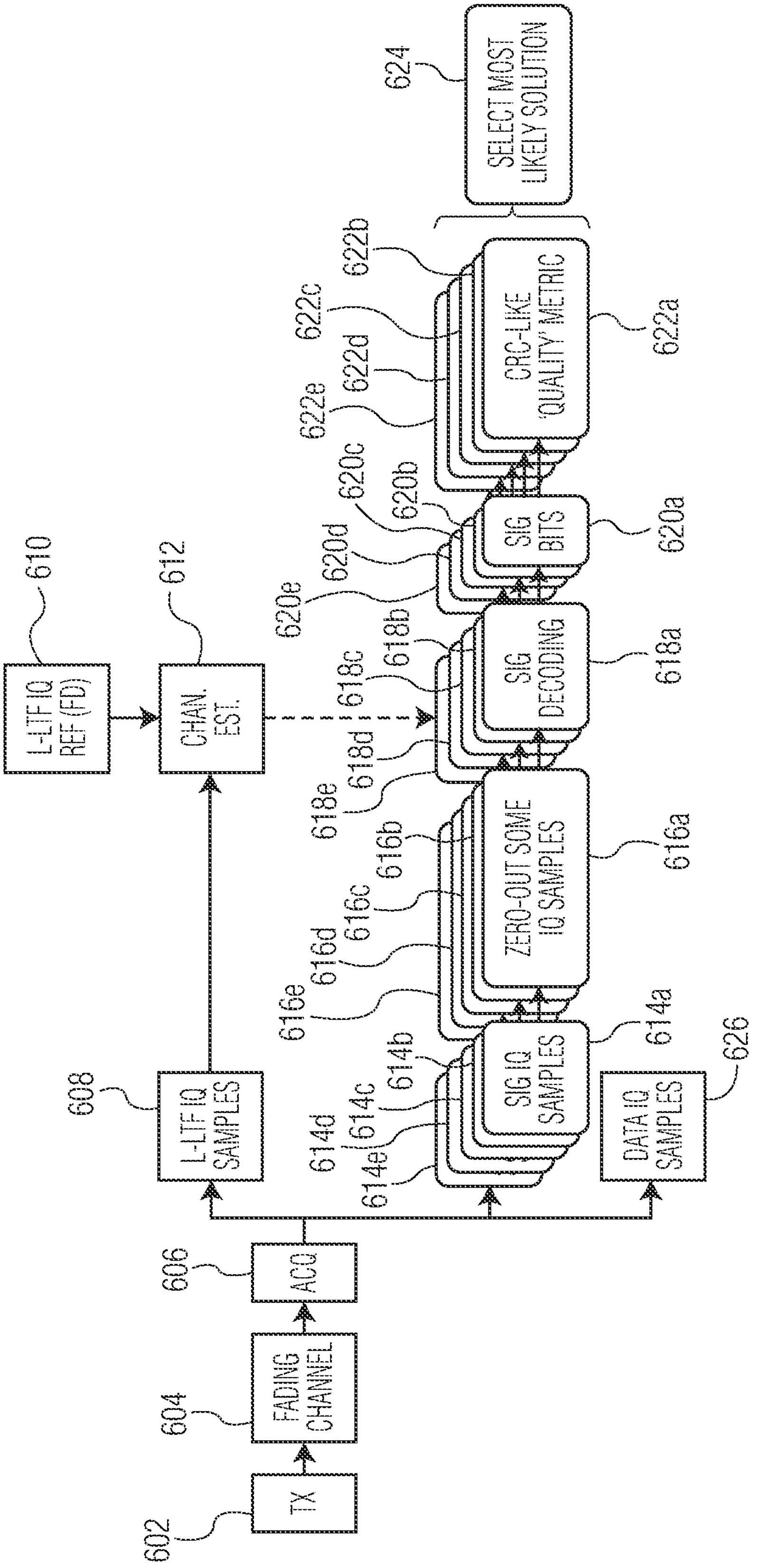
FIG. 6 depicts a signal processing data flow showing signal processing steps configured to decode L-SIG field data by creating a plurality of plurality of candidate L-SIG field decodings in which a different number of IQ values in the L-SIG field symbol are set to zero values when generating each candidate decoding.

To illustrate, FIG. 6 depicts a signal processing data flow showing signal processing steps configured to decode L-SIG field data by creating a plurality of plurality of candidate L-SIG field decodings in which a different number of IQ values in the L-SIG field symbol are set to zero values when generating each candidate decoding. The signal processing data flow of FIG. 6 may be executed by any suitably configured signal processing system of an RF receiver (e.g., the combination of antenna 129, RX 121', and RX processor 127 and/or antenna 129', RX 121", and RX processor 130).

Referring to FIG. 6, initially packets are transmitted 602 to a receiving device via a fading channel 604. The fading channel 604 introduces delay to the various data transmission which can, as described herein, increase the risk of ISI in transmissions received from vehicles participating in a vehicular communications system. The various transmissions combine as a received RF signal that is received at a receiving device. The signal is captured and made available for signal processing by signal acquisition circuit 606. Once the received signal is captured by signal acquisition circuit 606, in a first signal processing path, the received signal is processed to determine a plurality of L-LTF IQ samples 608 from the received signal. The L-LTF IQ samples 608 are combined with a reference L-LTF in the frequency domain 610 to generate a channel estimate 612 for the received signal.

In a separate signal processing path, the signal received by signal acquisition circuit 606 is processed to generate a plurality of L-SIG symbol IQ samples sets 614*a*-614*e*. Within each L-SIG symbol IQ samples sets 614*a*-614*e* a different number of IQ values are set to zero values to generate a corresponding set of IQ samples with a number of zeroed-out values 616*a*-616*e*.

In various embodiments, the signal processing algorithm depicted in FIG. 6 may be configured to generate any suitable number of L-SIG symbol IQ samples sets 614 with any suitable number of IQ values therein being blanked or zeroed out.

In one embodiment, for example, the data processing algorithm may be configured to generate a set of 10 L-SIG symbol IQ samples sets 614, where the 10 sample sets have 5, 10, 15, 20, 25, 30, 35, 40, 45, and 50 IQ samples zeroed out, respectively. Typically, this will involve blanking or zeroing-out the earliest N IQ samples in each set because those IQ samples are the most likely to contain values affected by ISI. In other approaches, however, any suitable algorithm may be utilized to select which IQ samples in a particular L-SIG symbol IQ data set to set to zero values.

In other algorithms, the data processing algorithm may create a set of N L-SIG symbol IQ samples sets 614, where the samples sets have N IQ samples zeroed out respectively (i.e., the first L-SIG symbol IQ set may have zero IQ samples set to zero, the second set only a single IQ sample (i.e., the first one) set to zero, while the seventh set may have six IQ samples set to zero, and the like).

Having generated the set of IQ sample sets with a number of zeroed-out values 616*a*-616*e*, each IQ sample set is decoded using the channel estimate 612 to generate a corresponding set of candidate L-SIG decodings 618, each including a number of L-SIG bits 620 (also referred to herein as L-SIG field control bits).

Each decoding in the set of candidate L-SIG decodings 618 and their respective L-SIG bits 620 are analyzed to determine whether they satisfy formatting requirements for properly decoded L-SIG field. This may involve applying a form of 'CRC-like' type of metric 622*a*-622*e* to each of the candidate L-SIG decodings 618.

For example, properly decoded L-SIG data should satisfy certain formatting requirements in accordance with the IEEE 802.11p standard, such as the L-SIG data must have 6 trailing bits (i.e., the last 6 bits in the L-SIG data) with each set to a zero value, must specify payload size having a size that varies between a given preconfigured range that specifies a minimum number of bytes (e.g., 14 bytes) and a maximum number of bytes (e.g., 2362 bytes), a fourth bit that is set to a value of 1, and a parity bit that matches the rest of the bits.

Accordingly, the signal processing method of FIG. 6 analyzes each of the candidate L-SIG decodings 618 to determine whether they satisfy the set of formatting requirements for properly formatted L-SIG field bits. If not, the candidate decoding 618 that is not properly formatted may be presumed to be an invalid decoding and can be discarded. If so, the properly formatted candidate L-SIG decodings 618 are then evaluated to select one of the candidate decodings 618 as the most likely solution 624 for signal decoding.

In an embodiment, this may involve identifying the candidate decoding 618 out of the set of candidate decodings that was generated from the set of IQ samples having the fewest or minimum number of zeroed-out values 616. With the L-SIG decoding determined, signal processing can continue to process a number of DATA IQ values 626 received from signal acquisition circuit 606 to determine the data encoded thereby.

In another implementation of the present method for L-SIG field decoding, the number of IQ samples to be "blanked out" or set to zero to facilitate decoding may be derived or determined using the L-LTF-based channel estimate statistics. Specifically, by converting the frequency domain signal's channel estimate into the time domain (by means of an IDFT (inverse discrete Fourier Transform)), it may be possible to identify the latest significant tap value of the time domain channel estimate. Based on the time that latest significant tap occurred within the time domain channel estimate, it is possible to estimate a maximum amount of delay in the channel receiving the signal to be processed. Based upon that estimated delay, an optimal number of L-SIG IQ samples can be set to zero to compensate for potential ISI in the received signal.

Figure 7:
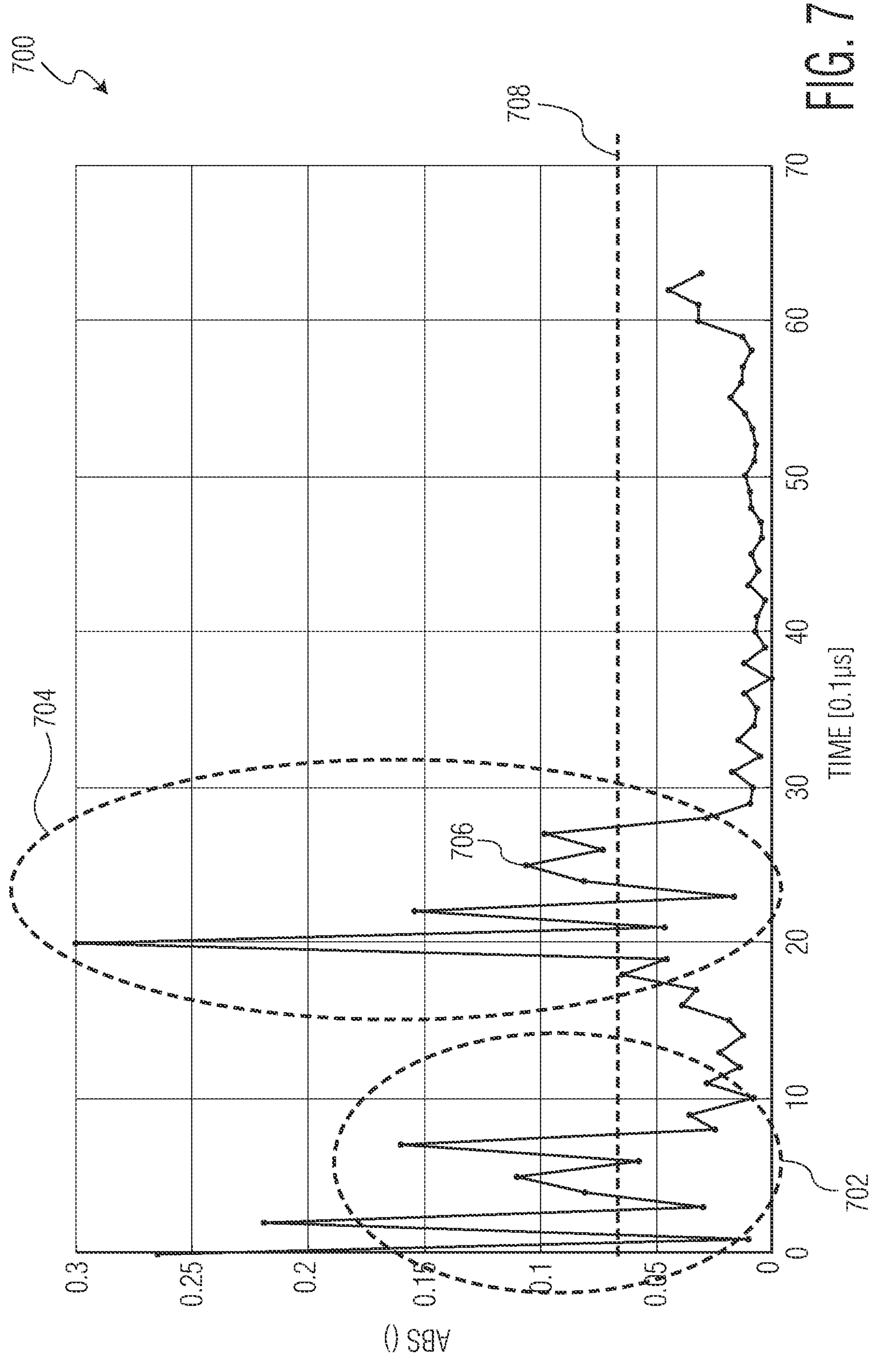
FIG. 7 is a chart depicting a waveform of a time domain channel estimate for a received signal that may include a first packet transmitted by a first transmitter and a second packet transmitted by a second transmitter.

For example, FIG. 7 is a chart 700 depicting a time domain view of the channel estimate for a received signal that may include a first packet transmitted by a first transmitter and a second packet transmitted by a second transmitter, where reception of the second packet is delayed with respect to reception of the first packet, but both packets include the same header information. In chart 700, the horizontal axis represents time, while the vertical axis represents magnitude. The time domain view is generated from the frequency domain channel estimate domain by means of an inverse discrete Fourier Transform (IDFT) operation with a transform size typically set to the number of subcarriers of the channel (e.g., 64-points transform size in the case of 10 MHz channel), leading to a granularity of 0.1 μs time interval between taps. Each meaningful channel tap can be identified by having a magnitude significantly larger than the noise floor, which typically resides in the second half of the time domain view.

As illustrated in chart 700, a first group of taps with significant magnitude (indicated by dashed circle 702) are likely associated with the reception of the first data packet. A second group of taps with significant magnitude (indicated by dashed circle 704) may be associated with the reception of the second data packet. Accordingly, by determining the last tap in the time domain channel estimate with a magnitude that exceeds a predetermined threshold (either in relative or absolute terms compared to the noise floor) (i.e., tap 706), it is possible to estimate overall channel delay. In various embodiments, the threshold may be a value equal to a multiple (e.g., 1.2× or 1.5×) of the noise floor of the time domain channel estimate. In other embodiments, the threshold may be a value that is determined at least partially by the communication protocol, or is otherwise derived based upon various attributes of the received signal and/or the communication channel over which the received signal was transmitted. The predetermined threshold specifies a value that, if exceeded by a particular tap, indicates that data transmission likely occurred during that tap. Conversely, if a tap's magnitude in the time domain channel estimate falls below that threshold, that indicates that no significant channel tap is identified for that time offset.

By identifying the last tap in the time domain channel estimate with a magnitude that exceeds the threshold, channel delay can be estimated. For example, with reference to chart 700, the last tap 706 with a magnitude that exceeds the threshold 708 is tap number 27 that occurs 2.7 μs into the time domain channel estimation 700. Accordingly, the overall channel delay may be estimated to be 2.7 μs. With that particular tap identified as being the latest tap with a magnitude exceeding the threshold 710 and the delay estimated, a signal processing approach may be utilized in which the first 2.7 μs of IQ samples of the L-SIG field symbol are set to zero values. In a typical 10 mega sample per second (MSPS) system in which IQ samples are generated every 0.1 μs, for example, this would equate to the first 27 IQ samples of the L-SIG field symbol being set to zero values. Normal signal processing then proceeds with a reduced risk of ISI degradation.

Figure 8:
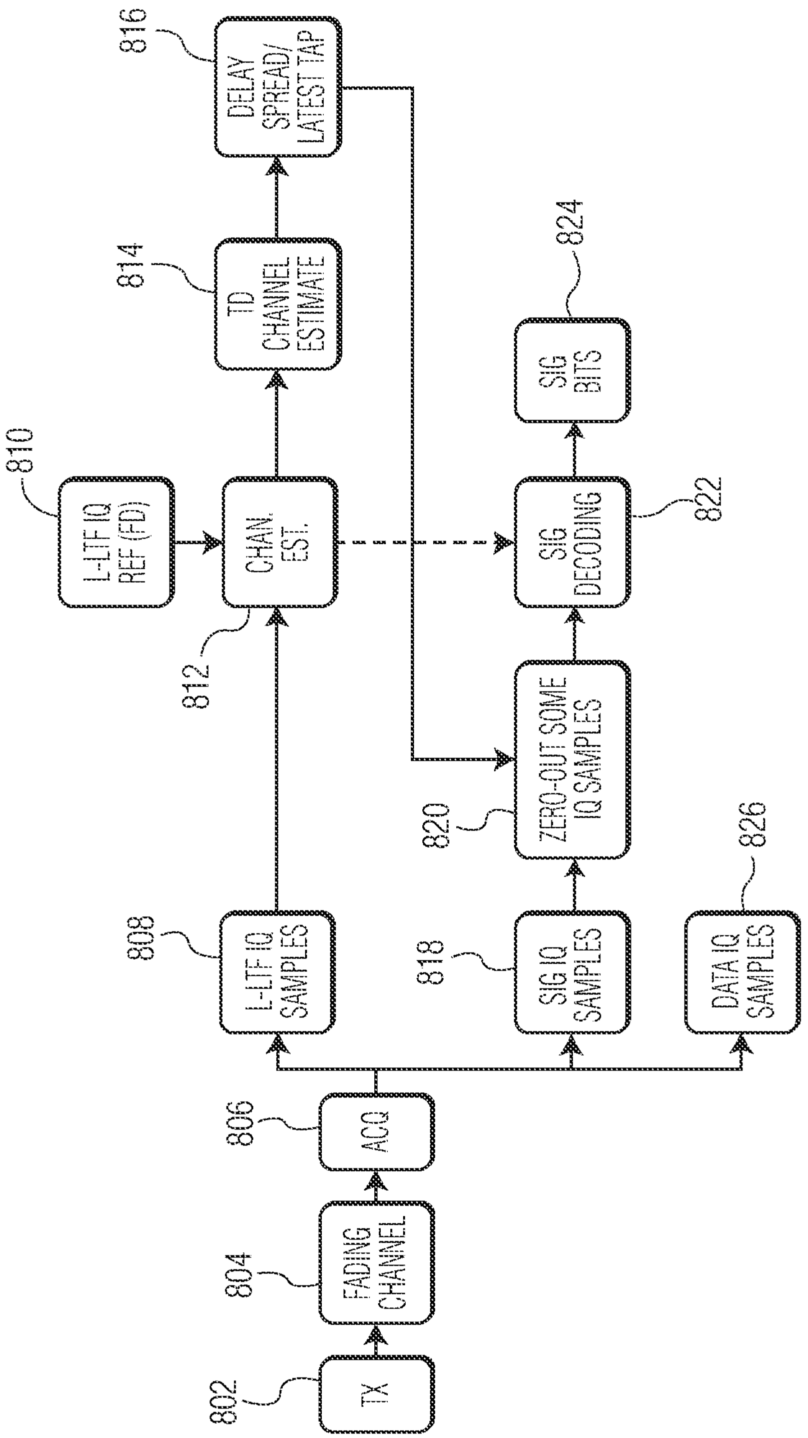
FIG. 8 depicts a signal processing data flow showing signal processing steps configured to decode L-SIG field data by setting a number of IQ values in the L-SIG field symbol to zero values based on a time domain channel estimate.

To illustrate this process, FIG. 8 depicts a signal processing data flow showing signal processing steps configured to decode L-SIG field data by setting a number of IQ samples in the L-SIG field symbol to zero values, where the number of values is determined using the time domain channel estimation. The signal processing data flow of FIG. 8 may be executed by any suitably configured signal processing chain of an RF receiver (e.g., the combination of antenna 129, RX 121', and RX processor 127 and/or antenna 129', RX 121", and RX processor 130).

Referring to FIG. 8, initially packets are transmitted 802 to a receiving device via a fading channel 804. The fading channel 804 introduces delay to the various data transmission which can, as described herein, increase the risk of ISI in data transmissions received from vehicles participating in a vehicular communications system. The various transmissions combine as an RF signal that is received at a receiving device. The signal is captured and made available for signal processing by signal acquisition circuit 806. Once the received signal is captured by signal acquisition circuit 806, in a first signal processing path, the received signal is processed to determine a plurality of L-LTF IQ samples 808 from the signal. The L-LTF IQ samples 808 are combined with a reference L-LTF in the frequency domain 810 to generate a channel estimate 812 for the received signal.

At this point the channel estimate 812 is in the frequency domain. Accordingly, an inverse Fourier transform is applied to the frequency domain channel estimate 812 to generate a time domain channel estimate 814. In an embodiment, the time domain channel estimate 814 is generated from the frequency domain channel estimate 812 by means of an IDFT with a transform size typically set to the number of subcarriers of the channel (e.g., 64-points transform size in the case of 10 MHz channel), leading to a granularity of 0.1 μs time interval in the time domain channel estimate 814. The time domain channel estimate 814 is then analyzed to determine which tap in the time domain channel estimate 814 is the latest tap 816 with a magnitude that exceeds a predetermined threshold, where the threshold is associated with a tap value indicative that data was transmitted during that tap. The threshold may be determined based upon a noise level of the time domain channel estimate 814. For the example the threshold may be a value equal to 1.2× or 1.5× of the noise level.

In a separate signal processing path, the signal received by signal acquisition circuit 806 is processed to generate L-SIG symbol IQ data set 818. In step 820 a number of IQ samples contained within the L-SIG symbol IQ data set 818 are set to zero values, where the number of zeroed-out IQ values is determined by the latest tap 816 in the time domain channel estimate 814. In an embodiment, the time at which the latest tap 816 occurs in the time domain channel estimate 814 is converted to the number of zeroed-out values by taking numerical value of the time at which the latest tap 816 in time domain channel estimate 814 occurred (e.g., 2.7 μs) and multiplying by a number equal to the receive sampling rate (e.g., 10 MSPS) of the signal acquisition circuit 806. With the number of IQ samples to be zeroed out determined, that number of IQ samples of the L-SIG symbol IQ sample set 818 occurring at the beginning of the L-SIG symbol IQ data set 818 are set to zero values to generate a L-SIG sample set comprising IQ samples with a number of zeroed-out values 820 that are then decoded in step 822 using channel estimate 812. The decoded L-SIG bits 824 (also referred to herein as L-SIG field control bits) can then be used in a separate signal processing path to decode DATA IQ samples 826, which may be retrieved from the received signal by signal acquisition circuit 806.

In another embodiment, rather than zeroing out certain IQ samples in the L-SIG field symbol to reduce the impact of ISI, ISI caused by L-LTF symbol spill-over is directly calculated and removed from the L-SIG symbol. Specifically, because a channel estimate is obtained from the L-LTF symbol, the channel estimate can be applied to the time-domain version of the known L-LTF sequence to calculate and remove L-LTF spill-over from the following symbol (i.e., the L-SIG symbol).

Figure 9:
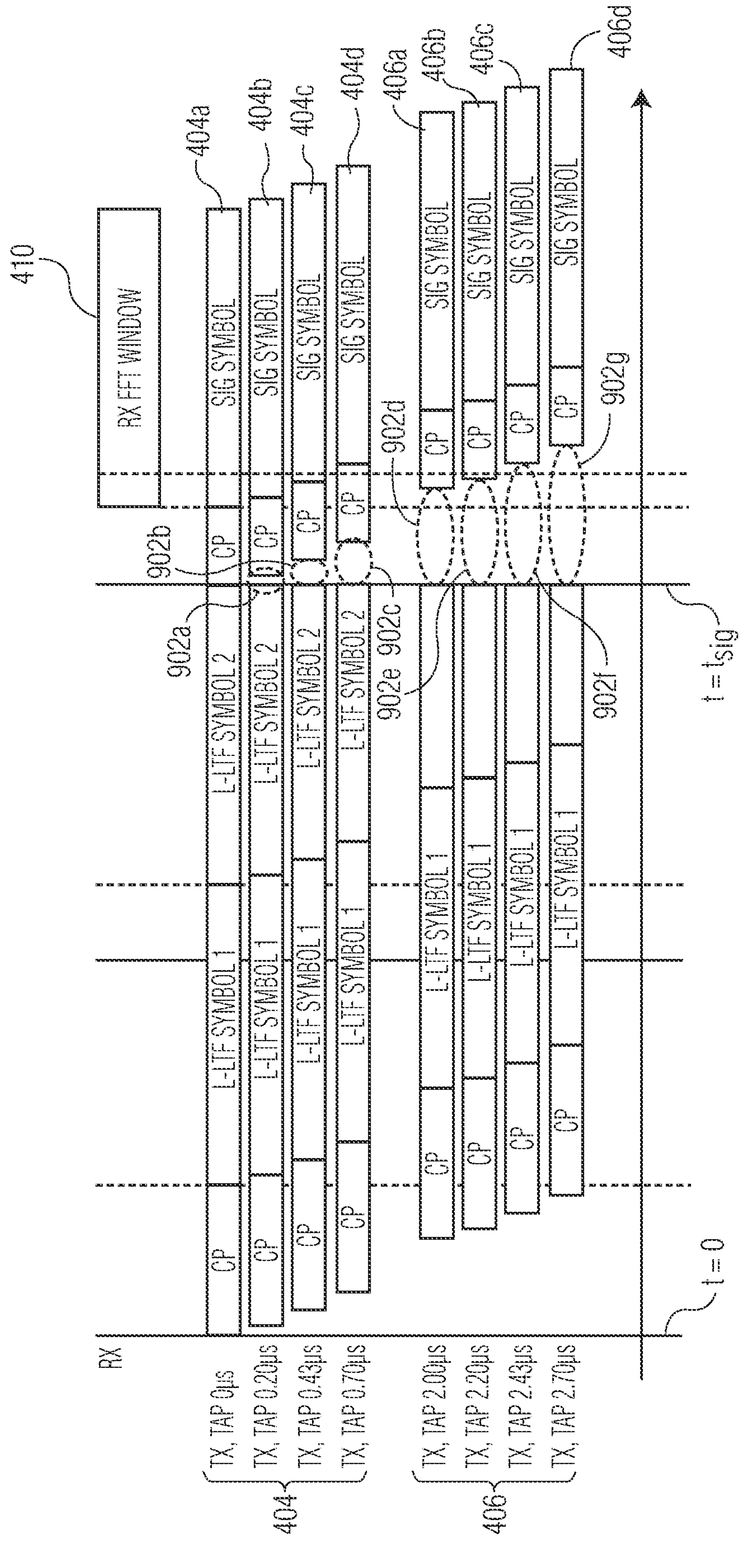
FIG. 9 is a timing diagram depicting receipt of a signal comprising two data packet transmissions where the transmissions are generated by two independent transmitters having an exemplary 2 μs relative delay and where portions of L-LTF symbols that spill-over into following L-SIG symbols have been removed.

To illustrate this process, FIG. 9 shows the timing diagram of FIG. 4 modified to depict a number of IQ samples removed from L-LTF data that would otherwise have spilled-over into following L-SIG symbols, thereby interfering with proper decoding of the L-SIG symbol. Specifically, with reference to FIG. 9, due to the delay of reception of the various taps of packet 404 and packet 406, portions of the L-LTF symbols in taps 404*b*, 404*c*, 404*d*, 406*a*, 406*b*, 406*c*, and 406*d* would otherwise have spilled-over into the following, respective, L-SIG symbols thereby causing ISI. In the depicted implementation, however, the channel estimate, generated using the received L-LTF symbol, is utilized to calculate and delete from the received signal portions of the L-LTF symbols that spilled-over (i.e., were received after time $t=t_{SIG}$) into their respective following L-SIG symbols. Portions of the received L-LTF symbols that are removed according to this approach are indicated by circles 902*a*-902*g*.

With the spill-over portions of the L-LTF symbols in the received signal deleted, the resulting received signal can be processed according to normal signal processing to decode the L-SIG symbol.

The removal of the 'tail' or spilled-over portions of L-LTF symbols in the received signal is done at the receiver by applying the channel estimate to the time-domain L-LTF sequence, and subtracting it from the IQ samples used for L-SIG decoding.

Figure 10:
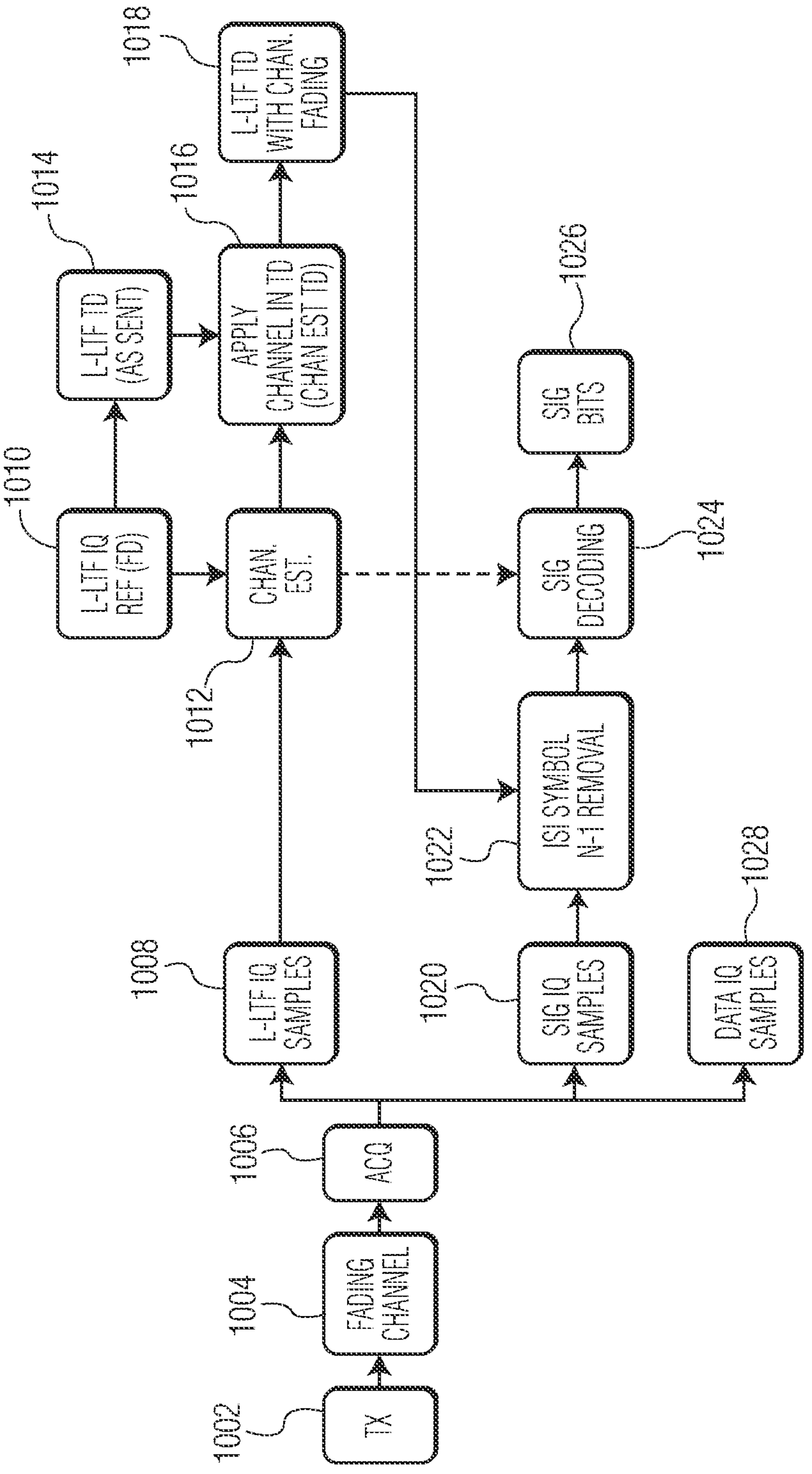
FIG. 10 depicts a signal processing data flow showing signal processing steps configured to decode L-SIG field data by directly removing L-LTF symbol interference from the following L-SIG field symbol based on a time domain channel estimation.

To illustrate, FIG. 10 depicts a signal processing data flow showing signal processing steps configured to decode L-SIG field data by removing spill-over portions of received L-LTF symbols. The signal processing data flow of FIG. 10 may be executed by any suitably configured signal processing chain of an RF receiver (e.g., the combination of antenna 129, RX 121', and RX processor 127 and/or antenna 129', RX 121", and RX processor 130).

Referring to FIG. 10, packets are transmitted 1002 to a receiving device via a fading channel 1004. The fading channel 1004 introduces delay to the various packet transmissions which can, as described herein, increase the risk of ISI in transmissions received from vehicles participating in a vehicular communications system. The various transmissions combine as a RF signal that is received at a receiving device. The RF signal is captured and made available for signal processing by signal acquisition circuit 1006.

After the received RF signal is captured by signal acquisition circuit 1006, in a first signal processing path, the received signal is processed to determine a plurality of L-LTF IQ samples 1008 from the received signal. The L-LTF IQ samples 1008 are combined with a reference L-LTF in the frequency domain 1010 to generate a channel estimate 1012 for the received signal. The reference L-LTF in the frequency domain 1010 is a known value. As such, it is possible to use the channel estimate 1012 to calculate the time-domain form of the L-LTF symbol as it was actually received by signal acquisition circuit 1006. Specifically, in step 1016, the frequency domain channel estimate 1012 is converted into a time-domain version of the channel estimate 1012 (Chan Est TD) is obtained by applying an inverse discrete Fourier Transform (IDFT) on the channel estimate 1012. The time-domain transform of the L-LTF sequence, L-LTF TD 1014, is obtained by applying an inverse discrete Fourier Transform (IDFT) on the L-LTF sequence 1010. Then, the time domain version of the channel, Chan Est TD, is applied to the time domain version of the LTF, L-LTF TD, by means of a finite impulse response filter (FIR), which essentially reproduces the taps of the propagation channel, to generate the L-LTF TD with channel fading 1018.

In a separate signal processing path, the RF signal received by signal acquisition circuit 1006 is processed to generate L-SIG symbol IQ data set 1020. To remove ISI in L-SIG symbol IQ data set 1020 caused by spill-over of the L-LTF symbol, the time-domain version of the L-LTF symbol that exhibits channel fading 1018 is subtracted from the L-SIG symbol IQ data set 1020. The channel estimate 812 is then applied to the modified L-SIG symbol IQ data set to generate decoded L-SIG bits 1026 (also referred to herein as L-SIG field control bits) via decoding step 1024. The decoded L-SIG bits 1026 can then be used in a separate signal processing path to decode DATA IQ samples 1028, which may be retrieved from the received signal by signal acquisition circuit 1006.

Figure 11:
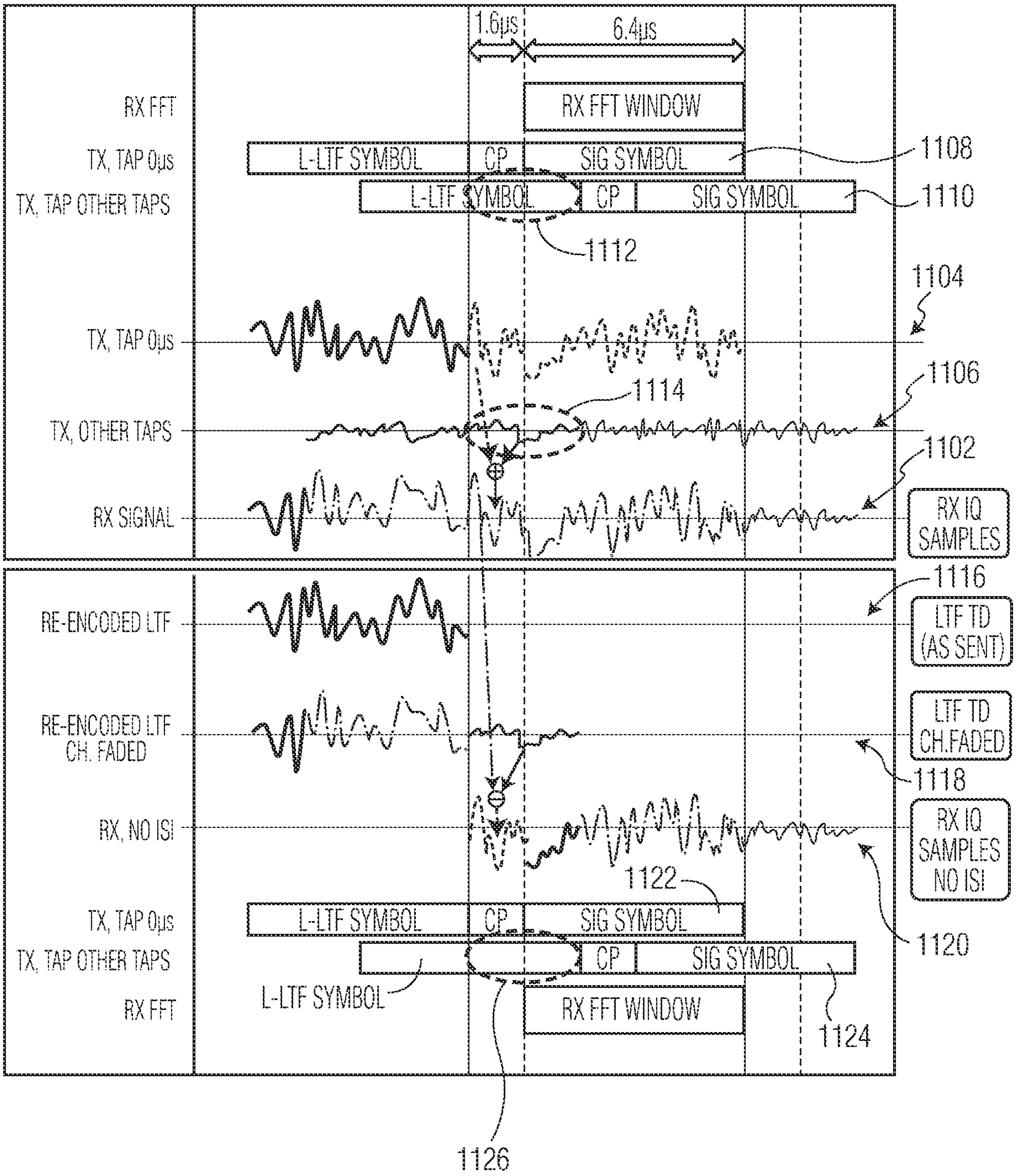
FIG. 11 depicts a series of waveforms depicting steps in an approach for removing L-LTF spill-over inter-symbol interference.

The sequence of signal processing steps depicting in FIG. 10 are illustrated visually in the various waveforms shown in FIG. 11. In FIG. 11, the horizontal axis represents time, and all depicted waveforms represent time domain depictions of various signals. Waveform 1102 represents the RF signal as received by the receiving device (e.g., signal acquisition circuit 1006 of FIG. 10). The signal of waveform 1102 is made up of a first received tap of the transmitted signal (waveform 1104) as well (waveform 1106) of the transmitted signal. In normal implementations, the received RF signal could include more than the two taps depicted in FIG. 11. The signal of waveform 1106 is delayed, as represented by the time offset of waveform 1106 as compared to waveform 1104. In accordance with the present disclosure, taps 1104 and 1106 may represent RF signals received from two different transmitting devices, but encoding the same IEEE 802.11p preamble.

For ease of reference, FIG. 11 also includes block representations 1108 and 1110 of waveforms 1104 and 1106. Block representation 1108 is aligned with waveform 1104 and indicates which portions of waveform 1104 include an L-LTF symbol, CP, and SIG symbol of that particular tap along the time axis. Similarly, block representation 1110 is aligned with waveform 1106 and indicates which portions of waveform 1106 include an L-LTF symbol, CP, and SIG symbol along the time axis.

As depicted, because the second tap of the transmitted packet, represented by waveform 1106, is substantially delayed as compared to the first tap represented by waveform 1104, a portion of the L-LTF symbol of the second tap (as depicted by block representation 1110) has spilled over into the CP and SIG symbol of the first tap, as indicated by dashed circle 1112.

To remove the spill-over, which would otherwise cause ISI, the spilled-over portion of the L-LTF symbol (represented by dashed circle 1114) in the waveform 1106 of the second tap is calculated and then subtracted from the original received signal (represented by waveform 1102) to remove the ISI (e.g., in accordance with the method depicted in FIG. 10).

Accordingly, the time domain version of the L-LTF symbol 1116 as originally transmitted (e.g., block 1014 of FIG. 10) is obtained by applying an inverse discrete Fourier Transform (IDFT) on the L-LTF sequence (e.g., block 1010 of FIG. 10). The L-LTF symbol as originally transmitted (e.g., block 1014 of FIG. 10) is represented by waveform 1116. As shown, however, that waveform is not delayed and has not been adjusted based upon channel delay conditions. As such, a channel estimate (e.g., channel estimate 1012 of FIG. 10) is applied to the L-LTF symbol as originally transmitted (e.g., via application of the channel estimate as a finite impulse response filter) to generate a time-domain version of the originally transmitted L-LTF symbol that exhibits channel fading, as represented by waveform 1118 (e.g., block 1018 of FIG. 10).

Waveform 1118, therefore, represents the delayed portion of the L-LTF symbol present in the second tap of the originally transmitted packet (i.e., waveform 1106). That delayed L-LTF symbol (with channel fading applied) is then subtracted from the originally received signal (i.e., waveform 1102) to delete the spilled-over portion of the L-LTF symbol in the delayed tap and to generate a waveform 1120 in which ISI has been removed. This is further illustrated by block illustrations 1122 and 1124 of waveforms 1104 and 1106 in which the spilled-over portion of the L-LTF symbol in the second tap (represented by block representation 1124) as depicted by dashed circle 1126.

Using this approach, therefore, a known value (i.e., the L-LTF reference signal) is utilized, in combination with the determined channel estimate, to directly calculate a waveform that represent the ISI caused by a tap of the transmitted signal that is delayed by a period exceeding the duration of the CP or receipt of a second packet having the same header information that is offset from an original packet by a time period greater than the CP duration. Once calculated, that waveform representative of the ISI can be subtracted from the originally received RF signal to remove the ISI from that signal. With the ISI so subtracted, normally signal processing can commence with an increased likelihood of successful signal decoding.

In an embodiment, a radio frequency (RF) receiver includes an antenna configured to receive a received RF signal, the received RF signal including a first RF signal encoding a first orthogonal frequency-division multiplexing (OFDM) symbol of a first long-term evolution (LTE) V2X data packet, and a signal processing system electrically connected to the antenna. The signal processing system is configured to receive the received RF signal and perform steps including determining legacy long training field (L-LTF) symbol using the received RF signal, calculating a channel estimation using the L-LTF symbol, determining legacy signal (L-SIG) field control bits from the received RF signal, the L-SIG field control bits including a plurality of IQ samples, generating a plurality of candidate L-SIG decodings using the IQ samples and the channel estimation, wherein each candidate L-SIG decoding of the plurality of L-SIG decodings is generated by setting a different number of IQ samples in the L-SIG field control bits to zero values, identifying a first L-SIG decoding of the plurality of candidate L-SIG decodings, and decoding a data field from the received RF signal using the first L-SIG decoding.

In an embodiment, a radio frequency (RF) receiver includes an antenna configured to receive a received RF signal, the received signal including a first RF signal encoding a first orthogonal frequency-division multiplexing (OFDM) symbol of a first long-term evolution (LTE) V2X data packet and a signal processing system electrically connected to the antenna. The signal processing system is configured to receive the received RF signal. The signal processing system is configured to perform steps including determining legacy long training field (L-LTF) symbol using the received RF signal, calculating a channel estimation using the L-LTF symbol, determining legacy signal (L-SIG) field bits from the received RF signal, the L-SIG field bits including a plurality of IQ samples, setting a number of IQ samples in the L-SIG field bits to zero values, wherein the number of IQ samples is determined using the channel estimation, generating an L-SIG decoding using the L-SIG field bits and the channel estimation, and decoding a data field from the received RF signal using the L-SIG decoding.

In an embodiment, a method includes receiving a received RF signal, the received RF signal including a first RF signal encoding a first orthogonal frequency-division multiplexing (OFDM) symbol of a first long-term evolution (LTE) V2X data packet, determining legacy long training field (L-LTF) symbol using the received RF signal, calculating a channel estimation using the L-LTF symbol, determining legacy signal (L-SIG) field control bits from the received RF signal, the L-SIG field control bits including a plurality of IQ samples, generating a plurality of candidate L-SIG decodings using the IQ samples and the channel estimation, wherein each candidate L-SIG decoding of the plurality of L-SIG decodings is generated by setting a different number of IQ samples in the L-SIG field control bits to zero values, identifying a first L-SIG decoding of the plurality of candidate L-SIG decodings, and decoding a data field from the received RF signal using the first L-SIG decoding.

In an embodiment, a radio frequency (RF) receiver includes an antenna configured to receive a received RF signal, the received RF signal including a first RF signal encoding a first orthogonal frequency-division multiplexing (OFDM) symbol of a first long-term evolution (LTE) V2X data packet and a signal processing system electrically connected to the antenna. The signal processing system is configured to receive the received RF signal and perform steps including converting the received RF signal into a frequency domain received RF signal, calculating a channel estimation in the frequency domain using a reference legacy long training field (L-LTF) symbol and the frequency domain received RF signal, converting the channel estimation in the frequency domain to a channel estimation in the time domain, determining an as-transmitted version of the reference L-LTF symbol, wherein the as-transmitted version of the L-LTF symbol is in the time domain, applying the channel estimation in the time domain to the as-transmitted version of the L-LTF symbol to determine an as-transmitted version of the L-LTF symbol that exhibits channel fading, subtracting a first portion of the as-transmitted version of the L-LTF symbol that exhibits channel fading from a second portion of the received RF signal to generate a second received RF signal to remove inter-symbol interference from the received signal, determining a legacy signal (L-SIG) field from the second received RF signal, and decoding a data field from at least one of the received RF signal and the second received RF signal using the L-SIG field.

In an embodiment, a radio frequency (RF) receiver includes an antenna configured to receive a received RF signal, the received signal including a first RF signal encoding a first orthogonal frequency-division multiplexing (OFDM) symbol of a first long-term evolution (LTE) V2X data packet and a signal processing system electrically connected to the antenna and being configured to perform steps including determining a time domain channel estimation using the received signal, determining an as-transmitted time domain version of an L-LTF symbol, applying the time domain channel estimate to the as-transmitted time domain version of the L-LTF symbol to determine an as-transmitted version of the L-LTF symbol that exhibits channel fading, and subtracting a first portion of the as-transmitted version of the L-LTF symbol that exhibits channel fading from a second portion of the received RF signal to generate a second received RF signal to remove inter-symbol interference from the received signal.

In an embodiment, a method includes receiving a received RF signal, the received RF signal including a first RF signal encoding a first orthogonal frequency-division multiplexing (OFDM) symbol of a first long-term evolution (LTE) V2X data packet, determining a time domain channel estimation using the received signal, determining an as-transmitted time domain version of an L-LTF symbol, applying the time domain channel estimate to the as-transmitted time domain version of the L-LTF symbol to determine an as-transmitted version of the L-LTF symbol that exhibits channel fading, and subtracting a first portion of the as-transmitted version of the L-LTF symbol that exhibits channel fading from a second portion of the received RF signal to generate a second received RF signal to remove inter-symbol interference from the received signal.

Embodiments of the present disclosure may include features recited in the following numbered clauses:

An embodiment of a radio frequency (RF) receiver includes an antenna configured to receive a received RF signal, the received RF signal including a first RF signal encoding a first orthogonal frequency-division multiplexing (OFDM) symbol of a first long-term evolution (LTE) V2X data packet; and a signal processing system electrically connected to the antenna and being configured to receive the received RF signal, the signal processing system being configured to perform steps including:

converting the received RF signal into a received RF signal in a frequency domain, calculating a channel estimation in the frequency domain using a reference legacy long training field (L-LTF) symbol and the received RF signal in the frequency domain, converting the channel estimation in the frequency domain to a channel estimation in a time domain, determining an as-transmitted version of the reference L-LTF symbol, wherein the as-transmitted version of the L-LTF symbol is in the time domain, applying the channel estimation in the time domain to the as-transmitted version of the L-LTF symbol to determine an as-transmitted version of the L-LTF symbol that exhibits channel fading, subtracting a first portion of the as-transmitted version of the L-LTF symbol that exhibits channel fading from a second portion of the received RF signal to remove inter-symbol interference from the received signal to generate a second received RF signal, determining a legacy signal (L-SIG) field from the second received RF signal, and decoding a data field from at least one of the received RF signal and the second received RF signal using the L-SIG field.

According to a further embodiment, the signal processing system is configured to perform the step of determining the as-transmitted version of the L-LTF symbol by performing steps including applying an inverse discrete Fourier transform on the reference L-LTF symbol to generate a time domain version of the L-LTF symbol.

According to another further embodiment, the signal processing system is configured to perform the step of applying the channel estimation in the time domain to the as-transmitted version of the L-LTF symbol by performing steps including applying the channel estimation in the time domain to the as-transmitted version of the L-LTF symbol as a finite impulse response filter.

According to another further embodiment, the received RF signal includes a second RF signal encoding a second OFDM symbol of a second LTE V2X data packet transmitted by a second remote transmitter.

According to another further embodiment, the second RF signal is delayed with respect to the first RF signal by a time period greater than a duration of a cyclic prefix encoded into the first RF signal.

According to another further embodiment, the duration of the cyclic prefix is equal to or less than 1.6 microseconds.

According to another further embodiment, the first RF signal the second RF signal each encode cooperative awareness messages.

Another embodiment of a radio frequency (RF) receiver includes an antenna configured to receive a received RF signal, the received signal including a first RF signal encoding a first orthogonal frequency-division multiplexing (OFDM) symbol of a first long-term evolution (LTE) V2X data packet; and a signal processing system electrically connected to the antenna and being configured to perform steps including:

determining a channel estimation in a time domain using the received signal, determining an as-transmitted version of an L-LTF symbol in the time domain, applying the channel estimation in the time domain to the as-transmitted version of the L-LTF symbol in the time domain to determine an as-transmitted version of the L-LTF symbol that exhibits channel fading, and subtracting a first portion of the as-transmitted version of the L-LTF symbol that exhibits channel fading from a second portion of the received RF signal to remove inter-symbol interference from the received signal and to generate a second received RF signal.

9. According to another further embodiment, the signal processing system is configured to perform the step of determining the as-transmitted version of the L-LTF symbol by performing steps including applying an inverse discrete Fourier transform on a reference L-LTF symbol to generate a time domain version of the reference L-LTF symbol.

According to another further embodiment, the signal processing system is configured to perform the step of applying the channel estimation in the time domain to the as-transmitted version of the L-LTF symbol by performing steps including applying the channel estimation in the time domain to the as-transmitted version of the L-LTF symbol as a finite impulse response filter.

According to another further embodiment, the received RF signal includes a second RF signal encoding a second OFDM symbol of a second LTE V2X data packet transmitted by a second remote transmitter.

According to another further embodiment, the second RF signal is delayed with respect to the first RF signal by a time period greater than a duration of a cyclic prefix encoded into the first RF signal.

According to another further embodiment, the duration of the cyclic prefix is equal to or less than 1.6 microseconds.

According to another further embodiment, the first RF signal the second RF signal each encode cooperative awareness messages, collective perception messages, or maneuver coordination messages.

An embodiment of a method includes receiving a received RF signal, the received RF signal including a first RF signal encoding a first orthogonal frequency-division multiplexing (OFDM) symbol of a first long-term evolution (LTE) V2X data packet;

determining a channel estimation in a time domain using the received signal;

determining an as-transmitted version of an L-LTF symbol in the time domain;

applying the channel estimation in the time domain to the as-transmitted version of the L-LTF symbol in the time domain to determine an as-transmitted version of the L-LTF symbol that exhibits channel fading; and subtracting a first portion of the as-transmitted version of the L-LTF symbol that exhibits channel fading from a second portion of the received RF signal to remove inter-symbol interference from the received signal and to generate a second received RF signal.

According to a further embodiment, the method also includes determining the as-transmitted version of the L-LTF by performing steps including applying an inverse discrete Fourier transform on a reference L-LTF symbol to generate a time domain version of the reference L-LTF symbol.

According to a further embodiment, the method also includes applying the channel estimation to the as-transmitted version of the L-LTF symbol as a finite impulse response filter.

According to a further embodiment, the method also includes determining a legacy signal (L-SIG) field from the second received RF signal, and decoding a data field from at least one of the received RF signal and the second received RF signal using the L-SIG field.

According to a further embodiment, the method also includes determining that the data field encodes a cooperative awareness message, a collective perception message, or a maneuver coordination message.

According to a further embodiment, the received RF signal includes a second RF signal encoding a second OFDM symbol of a second LTE V2X data packet transmitted by a second remote transmitter and the second RF signal is delayed with respect to the first RF signal by a time period greater than a duration of a cyclic encoded into the first RF signal and subtracting the first portion of the as-transmitted version of the L-LTF symbol that exhibits channel fading to remove inter-symbol interference from the received signal further comprises removing the inter-symbol interference caused by the delay of the second RF signal.

Various systems and methods described herein may be implemented in computer code running on a processor or controller system and may include code portions for performing steps of various method according to the disclosure when run on a programmable apparatus, such as a controller or enabling a controller to perform functions of a device or system according to the disclosure. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units, or devices, for example via intermediate devices.

Accordingly, unless implied or stated otherwise the connections may for example be direct connections or indirect connections. However, other modifications, variations and alternatives are also possible. The specifications and drawings are, accordingly, to be regarded in an illustrative rather than in a restrictive sense.

Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A radio frequency (RF) receiver, comprising:

an antenna configured to receive a received RF signal, the received RF signal including a first RF signal encoding a first orthogonal frequency-division multiplexing (OFDM) symbol of a first long-term evolution (LTE) vehicle-to-everything (V2X) data packet; and a signal processing system electrically connected to the antenna and being configured to receive the received RF signal, the signal processing system being configured to perform steps including:

converting the received RF signal into a received RF signal in a frequency domain, calculating a channel estimation in the frequency domain using a reference legacy long training field (L-LTF) symbol and the received RF signal in the frequency domain, converting the channel estimation in the frequency domain to a channel estimation in a time domain, determining an as-transmitted version of the reference L-LTF symbol, wherein the as-transmitted version of the L-LTF symbol is in the time domain, using a finite impulse response filter to apply the channel estimation in the time domain to the as-transmitted version of the L-LTF symbol to calculate a delayed portion of the L-LTF symbol, wherein the delayed portion of the L-LTF symbol results in inter-symbol interference, subtracting the delayed portion of the L-LTF symbol from a second portion of the received RF signal to remove inter-symbol interference from the received signal to generate a second received RF signal, determining a legacy signal (L-SIG) field from the second received RF signal, and decoding a data field from at least one of the received RF signal and the second received RF signal using the L-SIG field.

2. The RF receiver of claim 1, wherein the signal processing system is configured to perform the step of determining the as-transmitted version of the L-LTF symbol by performing steps including applying an inverse discrete Fourier transform on the reference L-LTF symbol to generate a time domain version of the reference L-LTF symbol.

3. The RF receiver of claim 1, wherein the received RF signal includes a second RF signal encoding a second OFDM symbol of a second LTE V2X data packet transmitted by a second remote transmitter.

4. The RF receiver of claim 3, wherein the second RF signal is delayed with respect to the first RF signal by a time period greater than a duration of a cyclic prefix encoded into the first RF signal.

5. The RF receiver of claim 4, wherein the duration of the cyclic prefix is equal to or less than 1.6 microseconds.

6. The RF receiver of claim 3, wherein the first RF signal and the second RF signal each encode cooperative awareness messages.

7. A method, comprising:

receiving a received RF signal, the received RF signal including a first RF signal encoding a first orthogonal frequency-division multiplexing (OFDM) symbol of a first long-term evolution (LTE) vehicle-to-everything (V2X) data packet;

converting the received RF signal into a received RF signal in a frequency domain;

calculating a channel estimation in the frequency domain using a reference legacy long training field (L-LTF) symbol and the received RF signal in the frequency domain;

converting the channel estimation in the frequency domain to a channel estimation in a time domain;

determining an as-transmitted version of a legacy long training field (L-LTF) symbol in the time domain;

using a finite impulse response filter to apply the channel estimation in the time domain to the as-transmitted version of the L-LTF symbol to calculate a delayed portion of the L-LTF symbol, wherein the delayed portion of the L-LTF symbol results in inter-symbol interference; and subtracting the delayed portion of the L-LTF symbol from a second portion of the received RF signal to remove inter-symbol interference from the received signal and to generate a second received RF signal.

8. The method of claim 7, further comprising determining the as-transmitted version of the L-LTF symbol by performing steps including applying an inverse discrete Fourier transform on a reference L-LTF symbol to generate a time domain version of the reference L-LTF symbol.

9. The method of claim 7, further comprising:

determining a legacy signal (L-SIG) field from the second received RF signal, and decoding a data field from at least one of the received RF signal and the second received RF signal using the L-SIG field.

10. The of method claim 9, further comprising determining that the data field encodes a cooperative awareness message, a collective perception message, or a maneuver coordination message.

11. The method of claim 7, wherein the received RF signal includes a second RF signal encoding a second OFDM symbol of a second LTE V2X data packet transmitted by a second remote transmitter and the second RF signal is delayed with respect to the first RF signal by a time period greater than a duration of a cyclic prefix encoded into the first RF signal and subtracting the delayed portion of the L-LTF symbol to remove inter-symbol interference from the received signal further comprises removing the inter-symbol interference caused by the delay of the second RF signal.

12. A radio frequency (RF) receiver, comprising:

an antenna configured to receive a received RF signal, the received RF signal including a first RF signal encoding a first orthogonal frequency-division multiplexing (OFDM) symbol of a first long-term evolution (LTE) vehicle-to-everything (V2X) data packet; and a signal processing system coupled to the antenna, the signal processing system configured to:

convert the received RF signal into a received RF signal in a frequency domain, calculate a channel estimation in the frequency domain using a reference legacy long training field (L-LTF) symbol and the received RF signal in the frequency domain, convert the channel estimation in the frequency domain to a channel estimation in a time domain, determine an as-transmitted version of a legacy long training field (L-LTF) symbol in the time domain, using a finite impulse response filter to apply the channel estimation in the time domain to the as-transmitted version of the L-LTF symbol to calculate a delayed portion of the L-LTF symbol, wherein the delayed portion of the L-LTF symbol results in inter-symbol interference, and subtract the delayed portion of the L-LTF symbol from a second portion of the received RF signal to remove inter-symbol interference from the received signal and to generate a second received RF signal.

13. The RF receiver of claim 12, wherein the signal processing system is configured to determine the as-transmitted version of the L-LTF symbol by applying an inverse discrete Fourier transform on a reference L-LTF symbol to generate a time domain version of the reference L-LTF symbol.

14. The RF receiver of claim 12, wherein the received RF signal includes a second RF signal encoding a second OFDM symbol of a second LTE V2X data packet transmitted by a second remote transmitter.

15. The RF receiver of claim 14, wherein the second RF signal is delayed with respect to the first RF signal by a time period greater than a duration of a cyclic prefix encoded into the first RF signal.

16. The RF receiver of claim 15, wherein the duration of the cyclic prefix is equal to or less than 1.6 microseconds.

17. The RF receiver of claim 12, wherein the first RF signal the second RF signal each encode cooperative awareness messages, collective perception messages, or maneuver coordination messages.

* * * * *